United States Patent [19]
Nishiwaki et al.

[11] Patent Number: 5,200,939
[45] Date of Patent: * Apr. 6, 1993

[54] OPTICAL HEAD APPARATUS INCLUDING A WAVEGUIDE LAYER WITH CONCENTRIC OR SPIRAL PERIODIC STRUCTURE

[75] Inventors: Seiji Nishiwaki, Katano; Yoshinao Taketomi, Moriguchi; Shinji Uchida, Osaka; Takaaki Tomita, Moriguchi; Junichi Asada, Ibaraki, all of Japan

[73] Assignee: Matsushita Electric Industrial Co., Ltd., Osaka, Japan

[*] Notice: The portion of the term of this patent subsequent to Feb. 12, 2008 has been disclaimed.

[21] Appl. No.: 474,757

[22] PCT Filed: Aug. 2, 1989

[86] PCT No.: PCT/JP89/00796
§ 371 Date: Apr. 4, 1991
§ 102(e) Date: Apr. 4, 1991

[87] PCT Pub. No.: WO90/01768
PCT Pub. Date: Feb. 22, 1990

[30] Foreign Application Priority Data

Aug. 5, 1988 [JP] Japan ................. 63-196583
Jun. 30, 1989 [JP] Japan ................. 1-170123

[51] Int. Cl.$^5$ ............ G11B 7/00; G02B 6/34; G02B 27/42
[52] U.S. Cl. .............. 369/44.12; 369/112; 250/201.5; 359/569; 385/14; 385/37
[58] Field of Search ........ 369/44.12, 44.14, 112, 369/110, 44.41, 44.42, 109, 44.24, 44.37; 250/201.5; 385/14, 11, 37, 50; 359/563, 558, 569

[56] References Cited

U.S. PATENT DOCUMENTS

| | | | |
|---|---|---|---|
| 4,672,187 | 6/1987 | Fujita et al. | 369/112 |
| 4,737,946 | 4/1988 | Yamashita et al. | 369/44.12 |
| 4,876,680 | 10/1989 | Mizawa et al. | 369/112 |
| 4,971,414 | 11/1990 | Funato et al. | 369/44.12 |
| 4,978,187 | 12/1990 | Minemura et al. | 385/14 |
| 4,991,919 | 2/1991 | Nishiwaki et al. | 369/44.12 |

FOREIGN PATENT DOCUMENTS

| | | |
|---|---|---|
| 0083805 | 7/1983 | European Pat. Off. |
| 0174008 | 3/1986 | European Pat. Off. |
| 0202689 | 11/1986 | European Pat. Off. |
| 0288033 | 10/1988 | European Pat. Off. ......... 369/44.12 |
| 0357780 | 3/1990 | European Pat. Off. |
| 63-164034 | 7/1988 | Japan . |
| 63-173239 | 7/1988 | Japan . |
| 63-183635 | 7/1988 | Japan . |
| 88/1344 | 7/1989 | PCT Int'l Appl. |

Primary Examiner—Aristotelis Psitos
Assistant Examiner—Thang V. Tran
Attorney, Agent, or Firm—Stevens, Davis, Miller & Mosher

[57] ABSTRACT

An optical head arranged in such a manner that light emitted from a semiconductor laser (8) is inputted and coupled in a waveguide layer (3C) by a grating coupler (4C) having a concentric or spiral structure formed by concavities and convexities so as to convert light into waveguide light (12C) passing toward to outer periphery in the layer, the waveguide light (12C) is shifted at the outermost peripheral portion of the waveguide layer (3C) to a waveguide layer (3B) so as to convert the waveguide light (12C) into waveguide light (12B), the waveguide light (12B) is radiated by a grating coupler (4B) having a concentric or spiral periodical structure, the concentrically polarized (or radially polarized) light (13) is converted into linearly polarized light (14) by a polarizing element (10B) so as to be converged on the reflection surface (16) of the optical disc, light reflected from the reflection surface (16) is again converted into concentrically polarized (or radially polarized) light (17A) and (17B) by the polarizing element (10B) so as to be inputted and coupled in waveguide layers (3A) and (3B) by a grating coupler (4A) and the grating coupler (4B), and then to be turned into waveguide light (18A) and (18B) each of which passes through the layer, and the waveguide light (18A) and (18B) is radiated at the end portions of the waveguide layers (3A) and (3B) so as to be respectively received by photo detectors (6A) and (6B) so that a control signal and a reproduction signal are obtained.

18 Claims, 17 Drawing Sheets

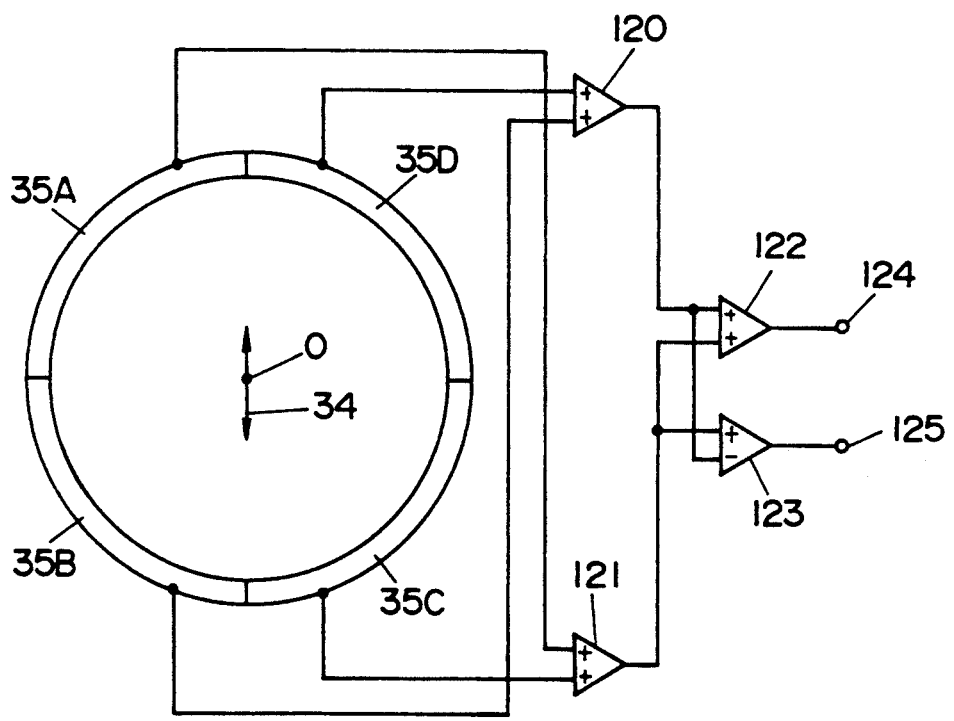
F I G. 16

LIST OF REFERENCE NUMERALS

1 ... Si substrate 2, 3A, 3B, 3C, 5A, 5B ... transparent layer 4A, 4B, 4C, 4B1, 4B2, 4B3, 4B4, 4B5, 4B6 ... grating coupler 6A, 6B ... photo detector 7 ... reflection layer 8 ... semiconductor laser 9 ... convergent lens 10A, 10B ... polarizer 11 ... laser beam 12B, 12C, 18A, 18B ... waveguide light 13 ... radiated light 15 ... optical disc 16 ... reflection surface 17A, 17B ... reflected light O ... center L ... central axis F, FA, FB, FC ... converging point

OPTICAL HEAD APPARATUS INCLUDING A WAVEGUIDE LAYER WITH CONCENTRIC OR SPIRAL PERIODIC STRUCTURE

BACKGROUND OF THE INVENTION

Field of the Invention

The present invention relates to an optical head apparatus capable of recording/reproducing information from an optical disc.

Hitherto, a technology for forming an optical head apparatus by a thin layer has been proposed, the optical head being capable of recording/reproducing information from an optical disc. For example, there has been a technology disclosed in PCT/JP 88/01344. FIG. 1 is a view which illustrates the structure of the conventional thin-film optical head apparatus. Referring to FIG. 1, a transparent substrate 2S holds a hollow Si-substrate 1 therebetween, the transparent substrate 2S having the surface on which gratings 4B and 4C are formed. The transparent substrate 2S is made of, for example, thermosetting resin. The concavities and convexities formed on the surface of the gratings 4B and 4C are formed by transferring the grating of a stamper. The grating 4C is formed in a circular region whose central axis is arranged to be an axis L passing through a point O, the grating 4C being in the form of a concentric or spiral cyclic concave and convex structure formed around the central axis L. The gratings 4B and 4C do not overlap each other and annular gaps are present therebetween. Waveguide layers 3B and 3C are formed on the transparent substrate 2S with a transparent layer 5 having a low refractive index formed therebetween, the waveguide layers 3B and 3C respectively having a higher refractive index than that of the transparent layer 5. Since the thickness of the transparent layer 5 is thin, the concavities and convexities of the gratings on the transparent substrate 2S remain on the transparent layer 5. The waveguide layers 3B and 3C formed thereon with concavities and convexities serve as grating couplers. The refractive index of the waveguide layer 3B is larger than that of the waveguide layer 3C, but the film thickness of the waveguide layer 3B is smaller than that of the waveguide layer 3C. The waveguide layer 3B is formed in an annular region relative to the central axis L, while the waveguide layer 3C is formed in a circular region relative to the central axis L. The inner peripheral portion of the waveguide layer 3B and the outer peripheral portion of the waveguide layer 3C overlap each other in such a manner that the waveguide layer 3C covers the waveguide layer 3B, the overlapped portion being positioned in an annular region positioned between the grating coupler 4C and the grating coupler 4B. A ring-like photo detector 6 is formed on the substrate 1 at the innermost portion of the waveguide layer 3B.

Laser beams emitted from the semiconductor laser 8 are turned into parallel ray light by a converging lens 9. The laser beam 11 converted into concentric polarization (a state of polarization in which a plane of vibration is tangent to a circle) or radial polarization (a state of polarization in which a plane of polarization is tangent to a circle) by a quarter wavelength plate 10C and a polarizing element 10, is made incident upon and coupled by the grating coupler 4C so as to be waveguide light 12C in a TE mode or a TM mode, the waveguide light 12C being propagated radially in the waveguide layer 3C. The waveguide light 12C is converted into waveguide light 12B after it has been shifted from the waveguide layers 3C and 3B, the waveguide light 12B being then converted into radiation mode light 13 which is converged at a point F on the central axis after being radiated from the grating coupler 4B. A reflection surface 16 of the optical disc is orthogonal to the axis L, the reflection surface 16 being positioned at substantially the same position as the focal point F. Therefore, the light is reflected by the reflection surface 16 so as to become reflected light 17B, the reflected light 17B being then made incident upon and coupled by the grating coupler 4B. As a result, the light is converted into waveguide light 18B which moves toward the center of the waveguide layer 3B. The thus formed waveguide light 18B is radiated at the innermost position of the waveguide layer 3B, and the quantity of the light is detected by the photo detector 6 disposed on the substrate 1.

FIG. 2 illustrates the detection of a signal performed by a conventional example. The grating coupler 4B is divided into 6 regions (that is, 4B1, 4B2, 4B3, 4B4, 4B5 and 4B6) by three straight lines passing through the center O. The regions 4B4, 4B5 and 4B6 are positioned diagonally to the corresponding regions 4B1, 4B2 and 4B3 with respect to the center O, the regions of the grating which are positioned diagonally relative to each other being in the form of the same shape (the same concave and convex structure). The radiated beams from the grating couplers 4B1 and 4B4 are converged at FC, while the radiated beams from the grating couplers 4B2 and 4B5 and that from the grating couplers 4B3 and 4B6 are converged to corresponding points FA and FB on the central axis L. The point FC is positioned at substantially a midpoint between the points FA and FB. The photo detector 6 is divided into 8 regions (that is, 6B1, 6B2, 6B3, 6B4, 6B4', 6B5, 6B6, and 6B1') by 4 straight lines passing through the center O. The regions 6B1, 6B1', 6B4 and 6B4' are respectively divided in the direction of rotation of the optical disc so as to confront the inner surfaces of the grating couplers 4B1 and 4B4. As a result, the photo detector 6 detects the quantity of returned waveguide light which has been supplied and coupled by the grating couplers 4B1 and 4B4. Also the regions 6B2, 6B3, 6B5 and 6B6 are respectively arranged to confront the inner surfaces of the regions 4B2, 4B3, 4B5 and 4B6 so that the quantity of waveguide light which has been supplied and coupled by the corresponding couplers is detected. A sum signal of 6B1 and 6B4 and that of 6B1' and 6B4' are derived by adding amplifiers 100 and 101, while the differences between the above regions are derived by a differential amplifier 102 so that a TE signal 103 is created. On the other hand, a reproduced signal 105 is created by conducting additions by an adding amplifier 104. Similarly, a sum signal of 6B2 and 6B5 and that of 6B3 and 6B6 are derived by adding amplifies 106 and 107, while the differences between the above regions are derived by a differential amplifier 108 so that an FE signal 109 is created.

FIG. 3 illustrates a change in the incident angle of reflected light. A grating pitch Λ at an emergent position A of radiated light can be obtained as a function of a diameter r from the following equation:

$$\Lambda = \lambda/(N + r/(f^2 + r^2)^{\frac{1}{2}}) \tag{1}$$

That is, the convergency toward the focal point F is realized by using the grating pitch $\Lambda$ as a function of the diameter r, where symbol $\lambda$ represents the wavelength of a laser beam, N represents an equivalent refractive index of the waveguide passage, and f represents a focal length {however, since the surface of the optical disc on which light is reflected is generally covered with a transparent plate, correction is necessary for a spherical aberration which can be generated when a converged light transmits through a parallel plate, that is, it is required to add a correction term to Equation (1)}. A diffraction angle $\theta$ of the radiation-mode light 13 can be given from the following equation:

$$\sin \theta = \lambda/\Lambda - N \qquad (2)$$

The factors q, r, and f hold the following relationship:

$$\tan \theta = r/f \qquad (3)$$

When the reflection surface 16 is positioned at the focal position F, light is reflected passing through AFA', while light is reflected passing through ABC when the reflection surface 16 is positioned closer to the focal point F by a distance $\epsilon$ (or positioned away from the focal point F by the same distance). Although light made incident upon point C on the grating coupler in a direction FC can be efficiently converted into waveguide light, its conversion efficiency (input coupling efficiency) deteriorates in proportion to the deflection from the direction FC. An angle $(\theta - \theta')$ of deflection with respect to the direction FC can be approximately obtained from the following Equation:

$$\theta - \theta' = \tan^{-1}(2\epsilon r/(f^2 + r^2)) \qquad (4)$$

Therefore, the deflection angle $(\theta - \theta')$ increases as $\epsilon$ increases causing the conversion efficiency to deteriorate. In order to make different from each other the points at which the radiated light from the grating couplers 4B1, 4B2 and 4B3 is converged respectively, there is a method of designing different grating couplers which correspond to different focal lengths f, the design being conducted in accordance with Equation (1). According to Equation (2), the focal points can be differ from each other by changing equivalent refractive index N for a waveguide passage in each of the coupler regions by using the same grating. For example, an increase in the thickness of the waveguide layer in a sequential order as 4B2, 4B1 and 4B3 causes the equivalent refractive index N to be increased in this order. Therefore, the focal points can differ easily. There is another method of varying the equivalent refractive index in which materials having different refractive indexes are placed on one waveguide layer.

FIG. 4(a) illustrates variation in the input coupling efficiency of reflected light as the position of the reflection surface varies. FIG. 4(b) illustrates, variation in the output of an FE signal, as the position of the reflection surface varies.

As is shown from Equation (4), the input coupling efficiency 19A with which the conversion into waveguide light is made by the grating couplers 4B2 and 4B5 varies depending upon the position of the reflection surface, the input coupling efficiency 19A describes a curve having its maximal value when the reflection surface is at the position FA. Similarly, the coupling efficiency 19B with which the conversion into waveguide light is carried out by the grating couplers 4B3 and 4B6 describes a curve having its maximal value when the reflection surface is at the position FB. Since the coupling efficiency is directly proportional to the quantity of returned waveguide light, the FE signal 109 has an S-curve characteristic with respect to the defocus of the reflection surface as shown in FIG. 4B. Therefore, a focus control can be conducted.

Furthermore, the zero-cross point of the output of the FE signal 109 corresponds to the case where the reflection surface is at the position FC. At this time, the coupling efficiency 19C in conversion into waveguide light by the grating couplers 4B1 and 4B4 is the largest. Therefore, when the reflection surface is positioned at the position FC, the influence from the signal (pits or dots) on the reflection surface of the optical disc appears in the form of a change in the optical distribution of reflected light 17B or a change in the quantity of light, that is, the change in the quantity of returned waveguide light 18B. As a result, high quality reproduced signal can be derived from a signal 105.

On the other hand, the reflection surface 16 of the optical disc has radially periodical guide grooves or pits in the direction of the rotation of the disc so that a tracking error appears in the form of an unbalance of the quantity of reflected light 17B in the radial direction of the disc when the reflection surface is positioned at the position FC. Therefore, when the quantity of light of waveguide light 18B is equally divided by a division line drawn in the direction of the rotation of the disc and the difference in the quantities of light is derived, the TE signal can be obtained from the signal 103 based on a so-called a push-pull method.

FIG. 5 illustrates a principle for converting linear polarization into concentric polarization. Linearly polarized laser beams which have been turned into parallel light by the converging lens 9 are converted into circularly polarized light 11' (states of polarization 11A', 11B', 11C' and 11D') after they have passed through the quarter wavelength plate 10C. The polarizing element 10 is formed by homogeneous type liquid crystal elements in such a manner that a homogeneous type liquid crystal 24 is disposed between transparent substrates 22 and 23. The surfaces 25 and 26 of the transparent substrates 22 and 23 are rubbed in directions (directions 24A, 24B, 24C and 24D) inclined by an angle of 45° from tangents to the concentric circle around the center O. Also the liquid crystal 24 is oriented in the same direction. Therefore, circularly polarized light 11' can be converted into radially or concentrically polarized light 11 by designing the liquid crystal 24 in such a manner that a component of light which transmits the liquid crystal 24 in the direction of the orientation delays (or advances) by a quarter wavelength. At this time aberration (phase lag) caused by polarizing conversion is corrected by adjusting the thickness of the transparent substrate 22 or 23, and accordingly, conversion into eccentric polarization or into radial polarization can be made completely (with no aberration). Thus, the following explanation is based upon this complete polarization. In the case of a concentrically polarized light, the directions of the polarization become 11A, 11B, 11C and 11D. When concentrically polarized light has been transmitted and coupled in the waveguide layer 3C by the grating coupler 4C, its waveguide light 12C is converted into the TE mode, while radially polarized light is converted into the TM mode. On the other hand, when waveguide light 12C, that is, 12B is in the TE mode, the radiated light from the grating coupler 4B is concentrically polarized light. When it is in the TM mode, the radiated light is radially polarized light. The structure may be constituted without the polarizing element 10. In this state, when a grating pitch Λ of the grating coupler 4C has been designed for coupling in the TE mode (that is, it has been designed as a solution of Equation (1) for the equivalent refractive index of the waveguide light in the TE mode), waveguide light 12C is in the TE mode, while the same is in the TM mode when the grating pitch Λ has been designed for coupling in the TM mode.

However, the optical head apparatus of the type described above arises the following problems:

First, the convergence of concentrically or radially polarized light 13 radiated from the grating coupler 4B is inferior. A curve (a) shown in FIG. 9 shows a cross section of the intensity distribution of concentrically polarized light (or radially polarized light) on a reflection surface {coordinate $(\xi, \eta)$}. That is, the field vectors of concentrically polarized (or radially polarized) light positioned diagonally with respect to the center are opposite to each other. Therefore, the field vectors are cancelled at the convergent point, causing the convergence to deteriorate.

Second, since the grating coupler 4B is arranged to be a ring-like shape, reflected light from the optical disc is shifted excessively from the ring-like portion when the optical disc has a reflection surface which is likely to diffract (scatter) light easily. It leads to a fact that the quantity of light which can be converted into waveguide light by the grating coupler 4B is reduced and the quality (C/N or the like) of the reproduced signals or control signals deteriorate.

Third, since the signal reproduction is achieved by increasing/decreasing the quantity of reflected light and input coupling light, a signal reproduction utilizing a change in a magnetic signal, that is, a signal reproduction utilizing the polarization state of light cannot be conducted.

Fourth, the output of the TE signal based on the push-pull method is the largest when the depth of pits is a ⅛ wavelength, while the same is zero when the depth is ¼ wavelength. Therefore, the detection of TE signals depending upon the conventional push-pull method cannot be conducted in a compact disc (CD) whose depth of pits is substantially 1/5 wavelength.

SUMMARY OF THE INVENTION

To this end, an object of the present invention is to provide a novel optical head apparatus capable of overcoming the above-described problems. Therefore, according to the present invention there is provided an optical head apparatus in which a periodical structure is arranged to be concentric or spiral in the waveguide passage so to converge waveguide light at a point outside the waveguide passage, the apparatus being characterized by having means for converting light radiated from the periodical structure into linearly or circularly polarized light or phase difference means causing the phase delay of radiated light to correspond to the azimuth angle with respect to the center of the concentric circle. Furthermore, a reproduction of a magnetic signal on a reflection surface is conducted by converging and receiving radiated light via a quarter wavelength plate or this plate and the phase difference means in combination.

BRIEF DESCRIPTION OF THE DRAWINGS

FIG. 16 is an explanatory view which illustrates the detection of the signal for the TE signal in the optical head apparatus according to a third embodiment of the present invention;

DESCRIPTION OF THE PREFERRED EMBODIMENTS

Figure 6:
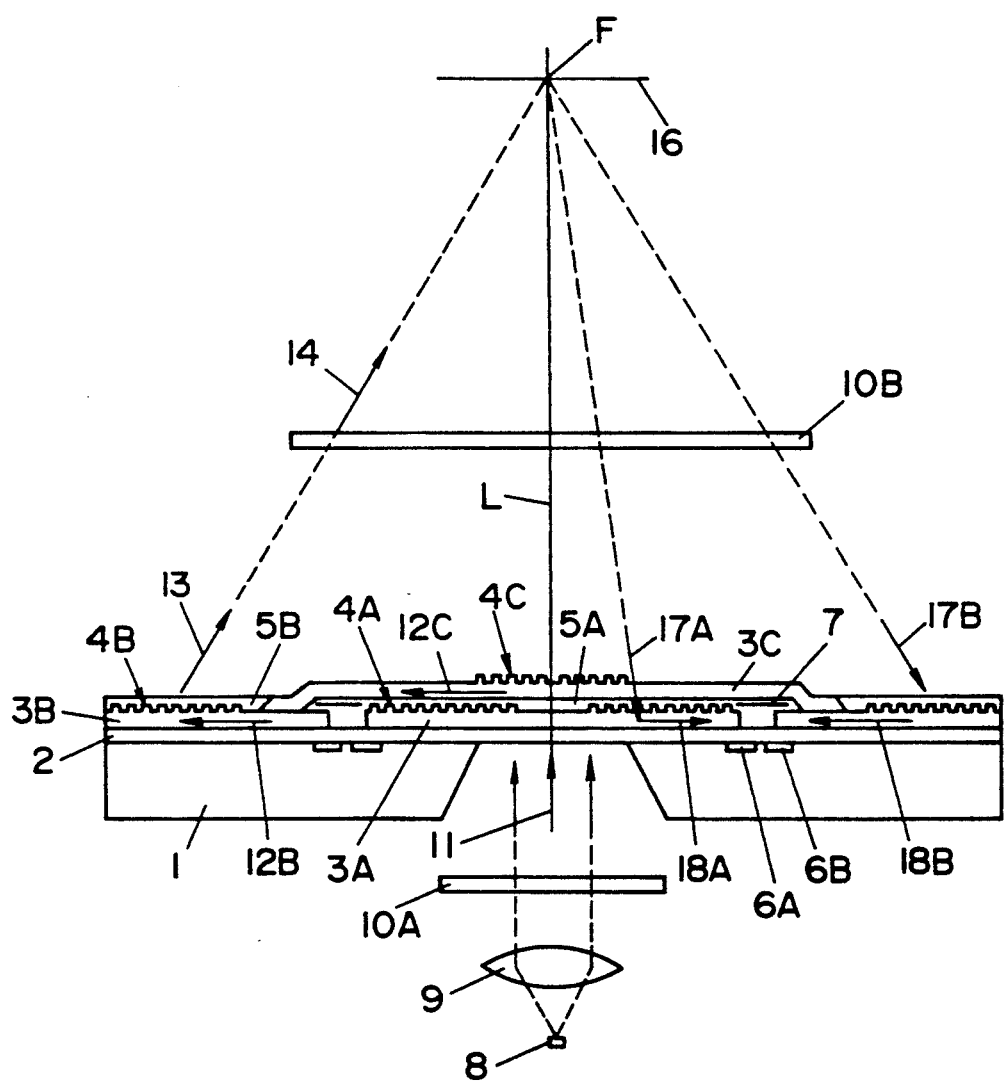
FIG. 6 is a cross sectional view which illustrates the structure of an optical head apparatus according to an embodiment of the present invention.

Then, embodiments of the present invention will now be described. FIGS. 6 to 10 illustrates an embodiment of the present invention. The same elements as those used in the conventional example are given the same reference numerals and their descriptions are omitted hereinafter. FIG. 6 is a cross sectional view which illustrates a first embodiment of the present invention. Referring to FIG. 6, a transparent layer 2 having a low refractive index is formed on an Si substrate 1, an a transparent layer 3 having a high refractive index is formed on the transparent layer 2. The transparent layer 3 is constituted by a circular portion 3A and an annular portion 3B surrounding the circular portion 3A, the above-described two portions being insulated from each other. Concentric or spiral grating couplers 4A and 4B, arranged around a central axis L, are formed on the surfaces of the transparent layers 3A and 3B in a circular region (or a ring-like region) and ring-like region formed around the central axis L. The grating can be manufactured by forming concavities and connexities in the surface of the transparent layer by using, for example, mask exposure and etching technologies. A transparent layer 3C having a high refractive index is formed on the surface of the transparent layer 3A holding a transparent layer 5A having a low refractive index formed therebetween. The transparent layer 3C is positioned in contact with the transparent layer 3B at a region confronting the inner peripheral surface of its grating coupler 4B. Concentric or spiral grating coupler 4C, arranged to be around the central axis L, is formed in a circular region, concentrically formed with the central axis L, on the surface of the transparent layer 3C. A transparent layer 5B having a low refractive index is formed so as to cover the region in which the grating coupler 4B is formed on the surface of the transparent layer 3B, the transparent layer 5B having the same refractive index as that of the transparent layer 5A. That is, when the transparent layers 3A and 3B have the same film thickness, their equivalent refractive indexes are the same. The Si substrate 1 has photo detectors 6A and 6B at positions corresponding to the insulated portion between the transparent layers 3A and 3B. A reflection film 7 is formed in the transparent layer 5A so as to cover the photo detectors 6A and 6B, the photo detectors 6A confronting the inner peripheral surface of the photo detector 6B. A portion of the Si substrate 1 in the vicinity of the central axis L is arranged to be hollow by etching or the like.

Linearly polarized light emitted from a semiconductor laser 8 is converged by a converging lens 9, and then it is converted into concentrically polarized (or radially polarized) light 11 by a polarizer 10A. The thus converted light 11 is inputted and coupled in the waveguide layer 3C by the grating coupler 4C so that waveguide light 12C in the TE mode (or TM mode) transmitting toward the outer periphery through the layer is created. The waveguide light 12C in the outermost region of the waveguide layer 3C shift to the waveguide layer 3B so that the waveguide light 12C is converted into waveguide light 12B. The waveguide light 12B is converted into concentrically polarized (or radially polarized) radiated light 13 after it has been radiated by the grating coupler 4B. The radiated light 13 is converted into linearly polarized light 14 after it has passed through the polarizing element 10B. Then, the light 14 is converged on a point F on the reflection surface 16 of the optical disc. Light reflected by the reflection surface 16 is again converted into concentrically polarized (or radially polarized) light beams 17A and 17B after it has passed through the polarizer 10B. The light beams 17A and 17B are inputted and coupled in the waveguide layers 3A and 3B so that waveguide light beams 18A and 18B in the TE mode (or TM mode) outwards or inwards transmitting in the layer are created. Both the waveguide light beams 18A and 18B are respectively radiated at the outermost and innermost portions of the waveguide layers 3A and 3B before being received by the photo detectors 6A and 6B, respectively. The reflection film 7 is capable of reflecting the radiated beam from the ends of the waveguide layers 3A and 3B so as to cause substantially all radiated beams to be received by the photo detectors 6A and 6B. Furthermore, the reflection film 7 acts to prevent scattered light or disturbance light of the waveguide light 12C from invading into the photo detectors 6A and 6B.

Figure 7:
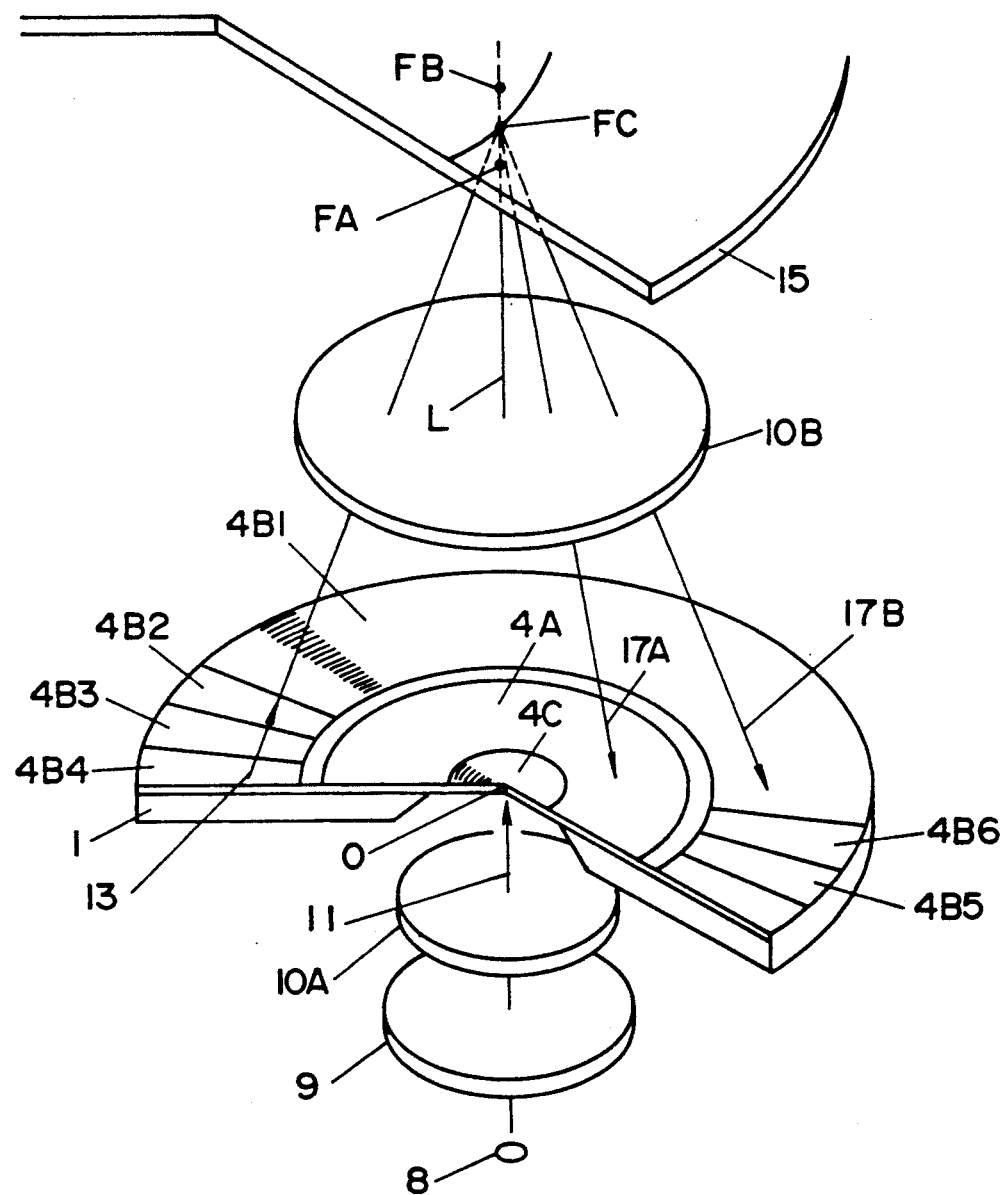
FIG. 7 is an explanatory view which illustrates the operation of the optical head apparatus as shown in FIG. 6.

FIG. 7 illustrates an external appearance view of the apparatus according to this embodiment. The grating coupler 4B is divided into 6 regions (that is, 4B1, 4B2, 4B3, 4B4, 4B5 and 4B6) by three straight lines passing through the center O. The gating coupler 4B1 and 4B4 are positioned diagonally to each other with respect to the center O so that radiated light therefrom converges at a focal point FC. Also the grating couplers 4B2 and 4B5, 4B3 and 4B6 are respectively positioned diagonally to each other with respect to the center O so that radiated light therefrom respectively converges at corresponding points FA or FB on the central axis L. Point FC is arranged to be at the midpoint position between points FA and FB.

Figure 8:
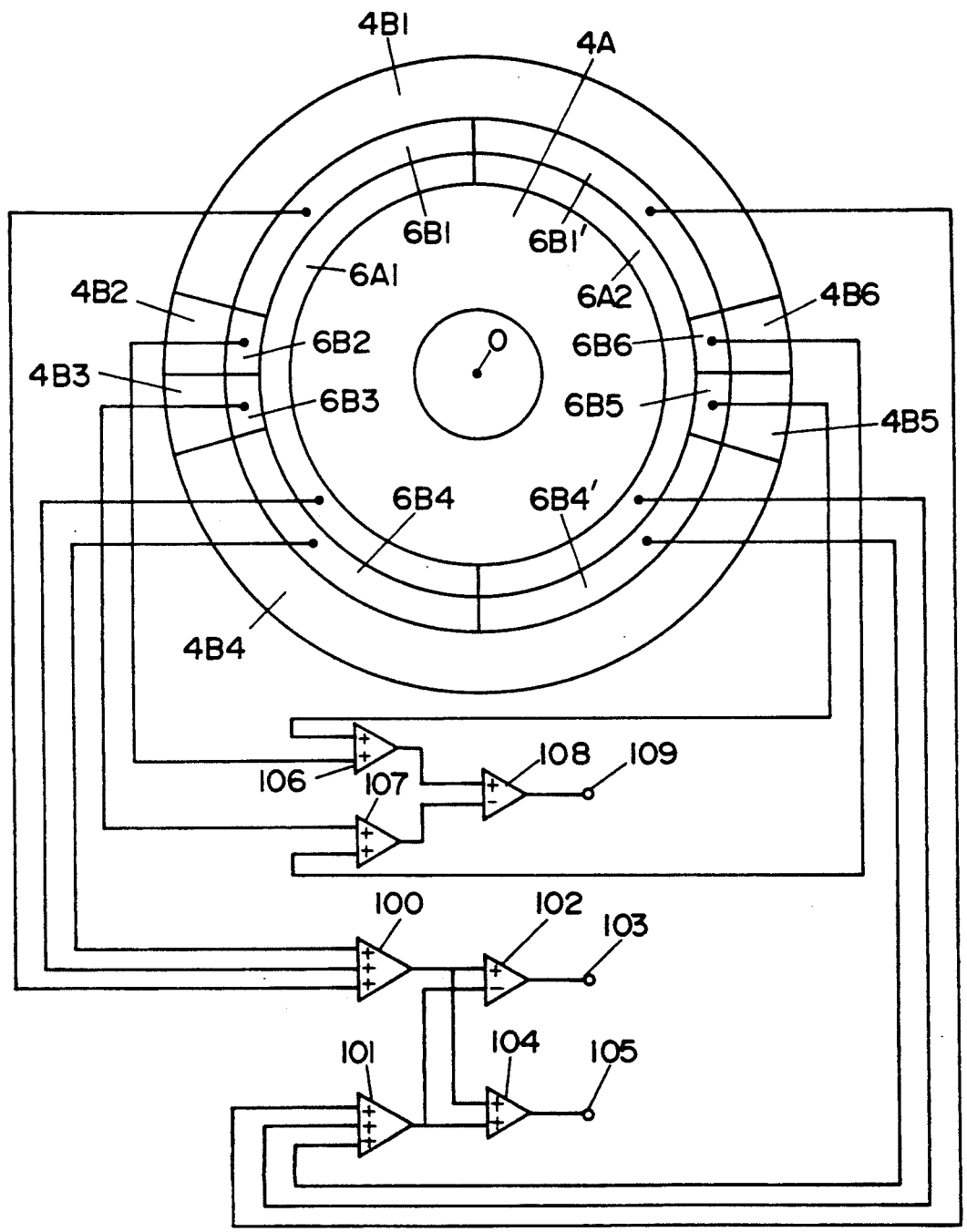
FIG. 8 is an explanatory view which illustrates the signal detection operation performed by the optical head apparatus as shown in FIG. 6.

FIG. 8 illustrates the signal detection operation by the optical head apparatus according to this embodiment of the present invention. The photo detector 6B is divided into 8 regions (that is, 6B1, 6B2, 6B3, 6B4, 6B4', 6B5, 6B6 and 6B1') by four straight lines passing through the center O. The photo detector 6A is also divided into two regions (that is, 6A1 and 6A2) by a straight line passing through the center O. The photo detectors 6B1, 6B1' and 6B4 and 6B4' respectively confront the inner surfaces of the grating couplers 4B1 and 4B4 so as to detect the quantity of waveguide light inputted and coupled by the grating couplers 4B1 and 4B4. Also the photo detectors 6B2, 6B3, 6B5 and 6B6 confront the inner surfaces of the corresponding grating couplers 4B2, 4B3, 4B5 and 4B6 so as to detect the quantity of waveguide light inputted and coupled by the corresponding grating couplers. The photo detectors 6A1 and 6A2 respectively confront the inner surfaces of the photo detectors 6B1, 6B2, 6B3, 6B4, 6B4', 6B5, 6B6 and 6B1' so as to detect the quantity of waveguide light inputted and coupled by the gating coupler 4A. The photo detectors 6B1 and 6B1', 6B4 and 6B4' and 6A1 and 6A2 are respectively divided equally, the division line thereof running parallel to the direction of rotation of the optical disc at the convergent point FC. The signal detection is conducted in such a manner that a sum signal from 6B1, 6B4 and 6A1, and that of 6B1', 6B4' and 6A2 are derived through adding amplifies 100 and 101, while the differences between the above photo detectors are derived through a difference amplifier 102 so that a TE (Tracking Error) signal 103 is created. On the other hand, a reproduced signal 105 is created by conducting additions by an adding amplifier 104. Similarly, a sum signal of 6B2 and 6B5 and that of 6B3 and 6B6 are derived by adding amplifies 106 and 107, while the differences between the above photo detectors are derived by a differential amplifier 108 so that an FE (Focus Error) signal 109 is created. The principles of the detections of the TE, FE, and the reproduction signals are the same as those conventionally used. Therefore, the explanation thereof are omitted.

Then, the convergent characteristic of the optical head apparatus according to the present invention will be described.

Figure 9A:
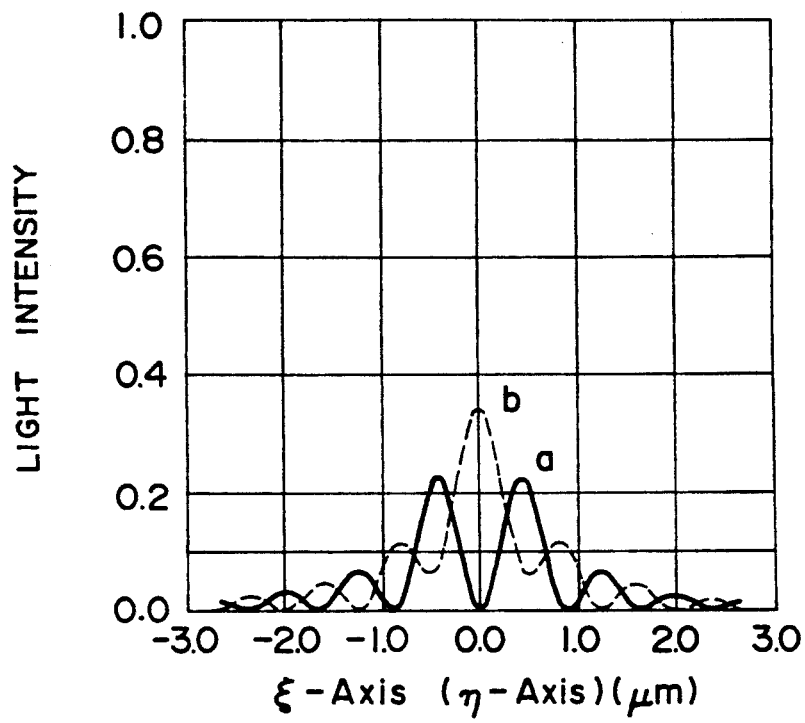
FIGS. 9(a) and 9(b) are graphs for comparing the light intensity distributions on a focal plane when the state of polarization is changed and the conditions of aperture are changed.
Figure 9B:
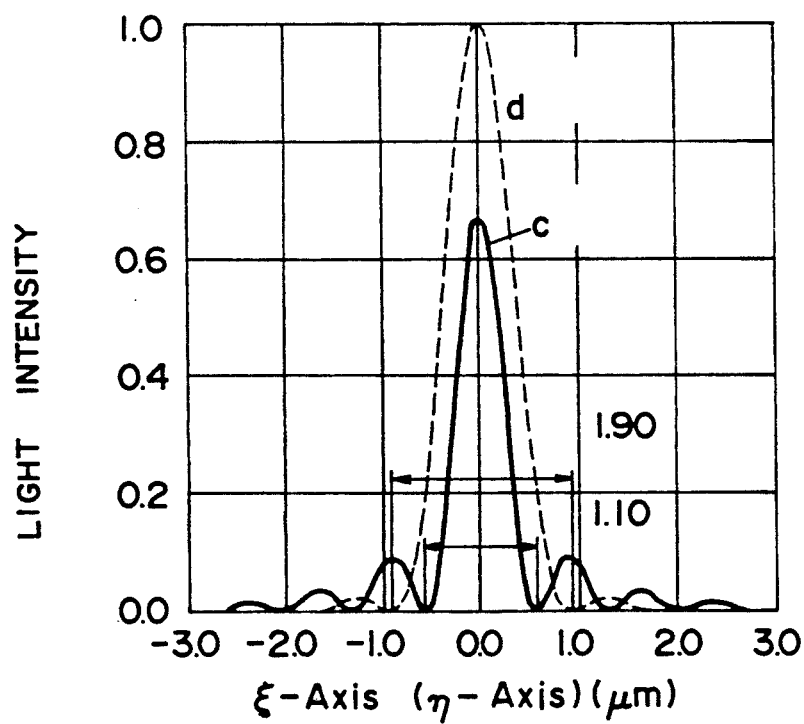

As described above, radiated light 13 from the grating coupler 4B becomes concentrically polarized light if the waveguide light 12B is in the TE mode, while it becomes radially polarized light if the waveguide light is in the TM mode. Curves (a), (b) and (c) shown in FIGS. 9(a) and 9(b) show cross sections of the light intensity distribution on a focal plane {coordinate ($\xi$, $\eta$)} in the case of a ring-like aperture of sin $\theta = 0.44$ to 0.60 and uniform intensity distribution, where curve (a) denotes concentrically polarized (or radially polarized) light, and curve (c) denotes linearly polarized (or circularly polarized) light. It is apparent from the result of a comparison made between the curves (a) and (c) that the convergent performance of concentrically polarized (or radially polarized) light is insufficient since the field vectors disposed diagonally with respect to the center are opposite to each other, causing the field vectors to be cancelled at the convergent point. In order to obtain excellent convergent performance, the radiated light 13 must be converted into a spatially uniform state of polarization such as linearly polarized light and circularly polarized light. On the other hand, the input coupling efficiency of reflected light beams 17A and 17B into the grating coupler is determined depending upon the state of polarization of reflected light such that the deflection of reflected light from the state of polarization of radiated light proportionally causes the coupling efficiency to deteriorate. Therefore, in order to cause concentrically (or radially) polarized radiated light to have excellent convergent performance and high efficiency in input-coupling reflected light, a polarizing element capable of conducting reversible conversion between linear (or circular) polarization and concentric (or radial) polarization is necessary. The curve (d) shown in FIGS. 9(b) shows a section of the light intensity distribution of linearly polarized (or circularly polarized) light on a focal plane in the case of a ring-like aperture of sin $\theta = 0.00$ to 0.50 and uniform intensity distribution. It is apparent from the result of comparison made between curves (c) and (d) that the diameter of the spot of the main lobe can be significantly reduced by employing a ring-like aperture. The spot diameter d (that is, the diameter of the dark line portion of the airy disc) is arranged to be about 1.10 $\mu$m which is extremely smaller than the spot diameter of 1.90 $\mu$m of the spot of the circular aperture. Therefore, since the diameter of a reflected signal is determined by the spot diameter d of the laser beam in the case of a recording optical disc, the signal recording density can be significantly improved.

Figure 1:
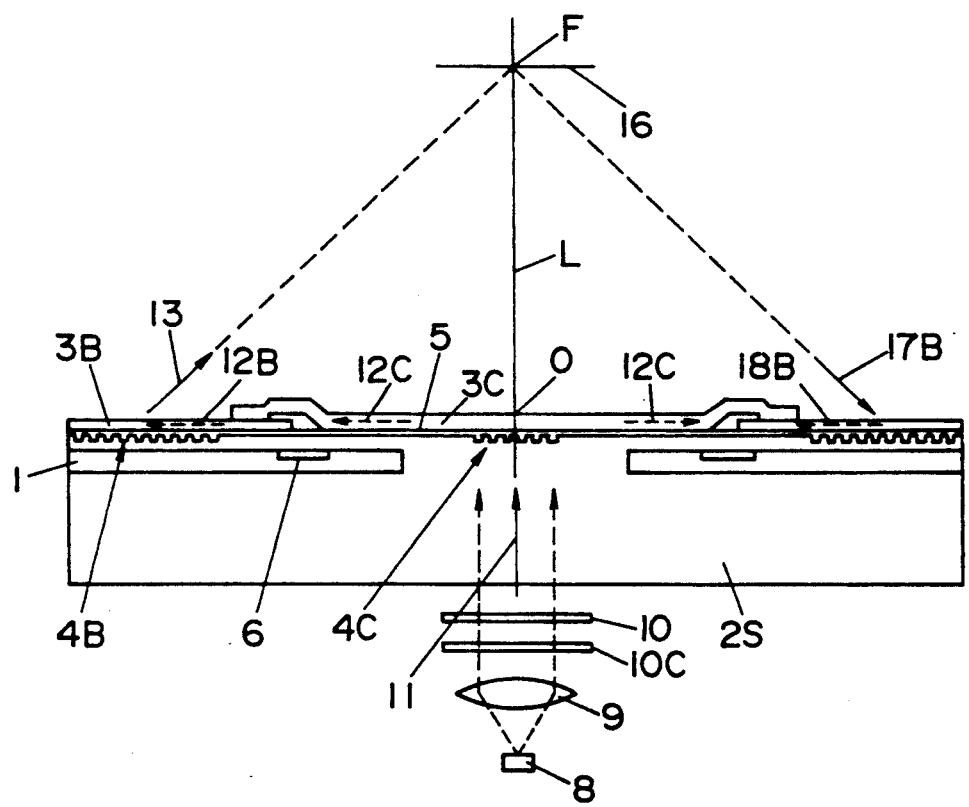
FIG. 1 is a cross sectional view which illustrates the structure of an example of conventional thin-film optical head apparatus.
Figure 2:
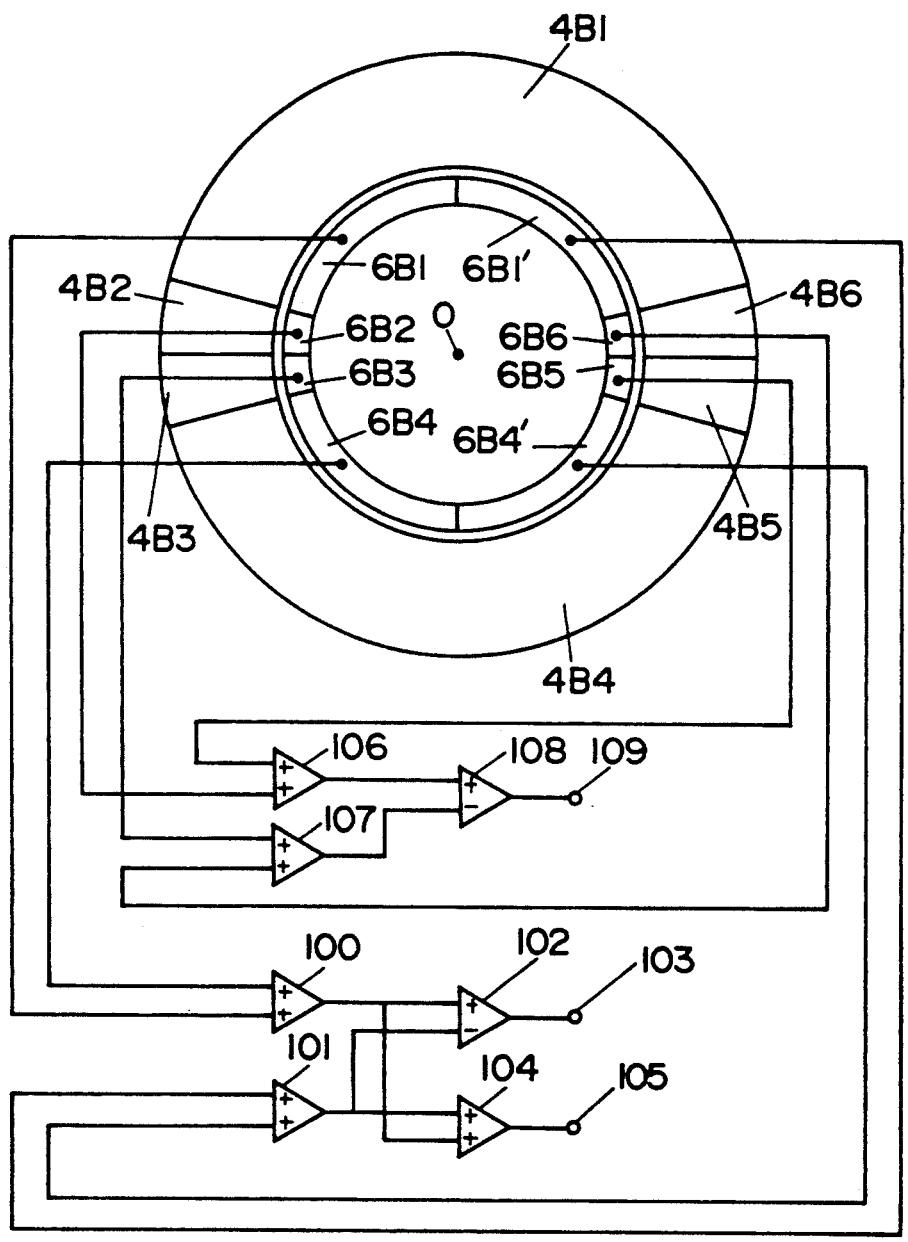
FIG. 2 illustrates a detection of a signal conducted by the conventional example.
Figure 3:
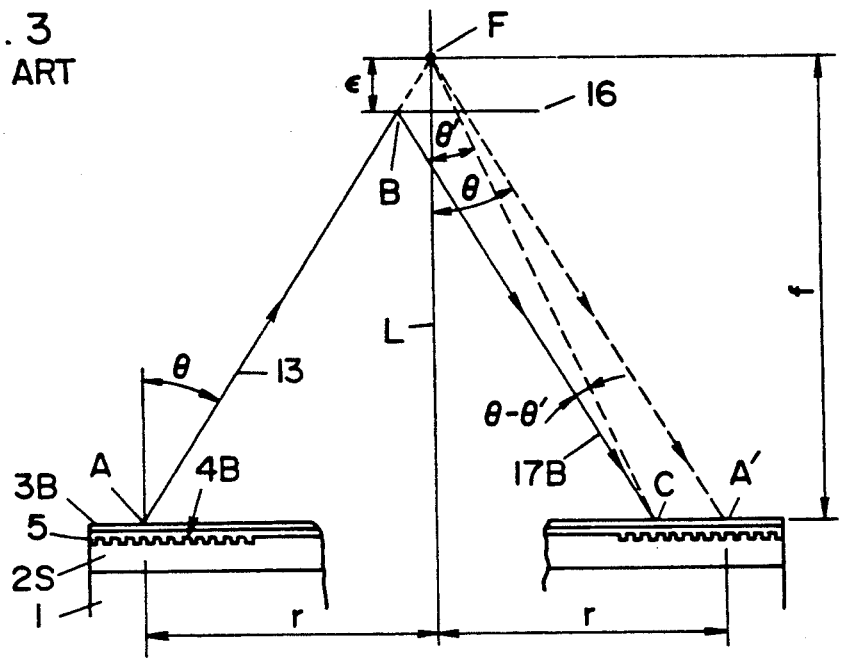
FIG. 3 is a cross-sectional view which illustrates a change in an incident angle of returned light in the conventional example.
Figure 4A:
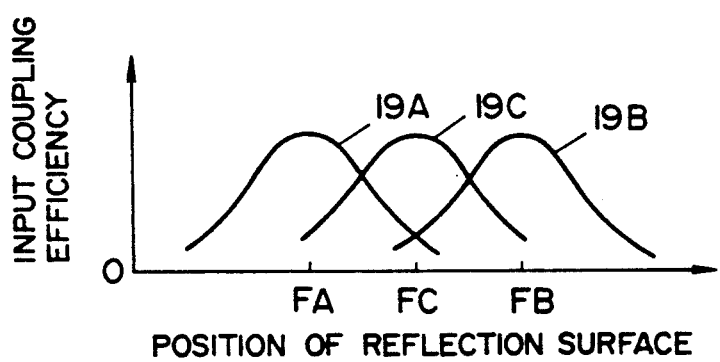
FIGS. 4(a) and 4(b) are graphs which respectively illustrate variation change in input coupling efficiency of returning light and variation in the output of the FE signal when the position of the reflection surface is shifted in the conventional example.
Figure 4B:
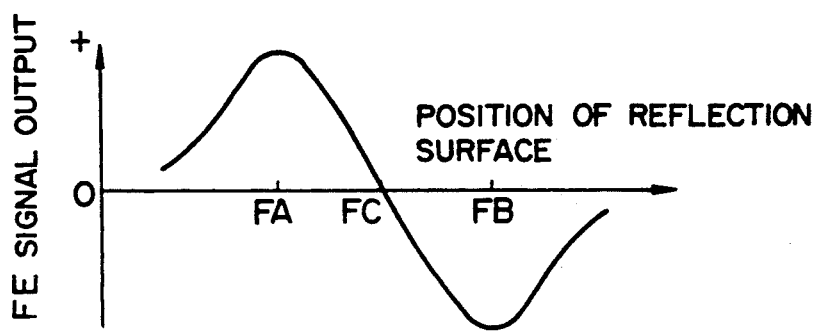
Figure 5A:
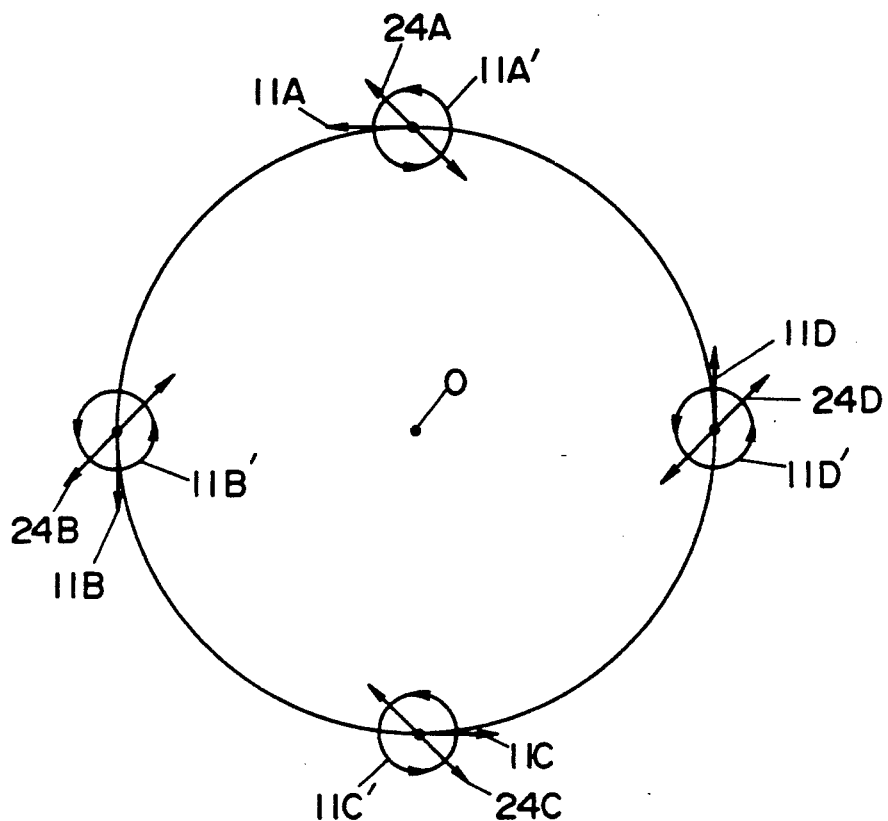
FIGS. 5(a) and 5(b) are explanatory views which illustrate a principle of converting linearly polarized light into concentrically polarized light in the conventional example.
Figure 5B:
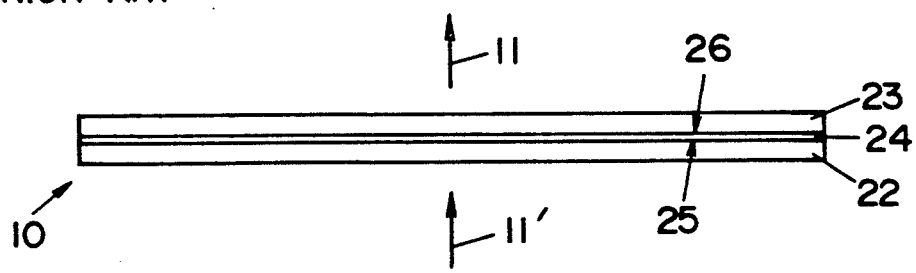
Figure 10A:
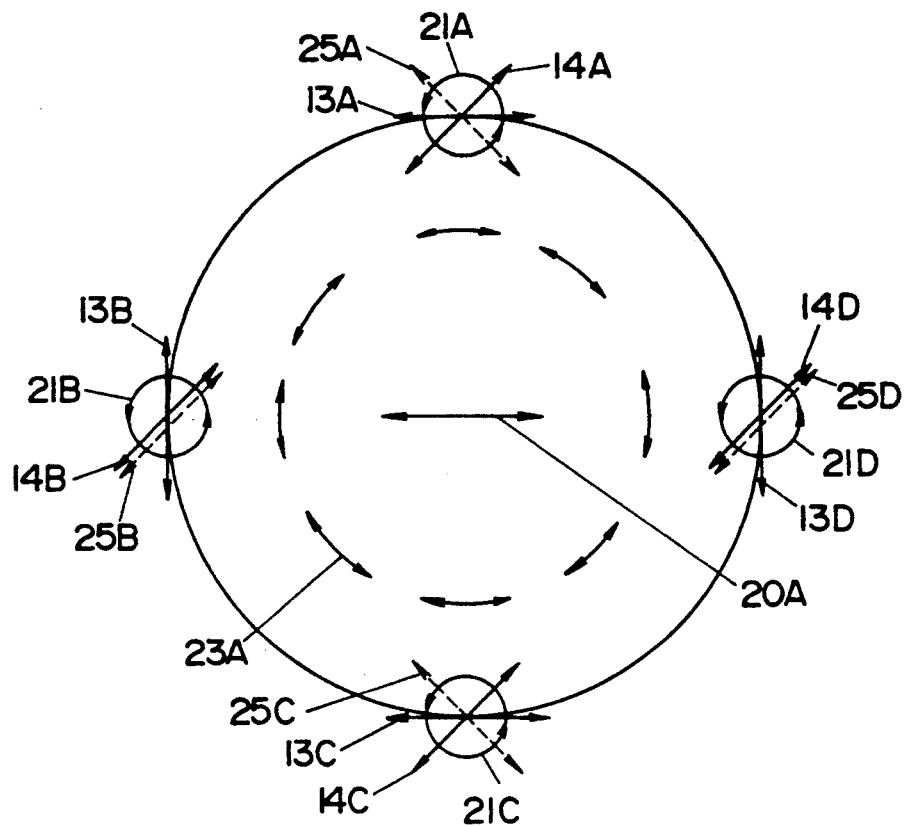
FIGS. 10(a) and 10(b) illustrate a principle for converting concentric polarized light into linearly polarized light performed by the optical head apparatus according to an embodiment of the present invention.
Figure 10B:
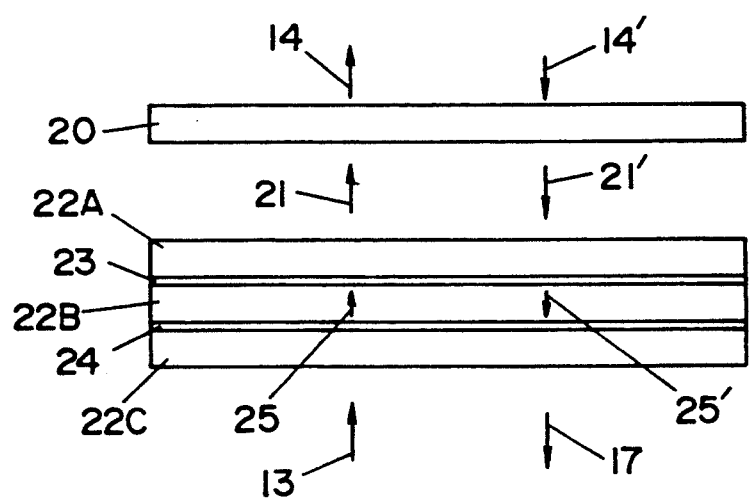

FIGS. 10(a) and 10(b) illustrate the polarizing element capable of conducting a conversion between linearly polarized light and concentrically polarized light. The polarizing element capable of the conversion has been illustrated in FIG. 5 which shows a conventional arrangement. Furthermore, there is another type of a polarizing element disclosed in Japanese Patent Application No. 63-19653. That is, a liquid crystal 24 is disposed between transparent substrates 22 and 23, the transparent substrate 22 having a surface 25 rubbed tangent to a concentric circle around the center O. On the other hand, the transparent substrate 23 has a surface 26 rubbed in a direction 20. Therefore, the liquid crystal 24 is oriented tangent (21A, 21B, 21C, 21D, 21E, 21F, 21G and 21H) to a concentric circle around the center O in the vicinity of the substrate surface 25, while the same is oriented in a direction 20 in the vicinity of the substrate surface 26. A structure, in which the above-described polarizing element is used as the polarizer 10B and a proper liquid crystal material and a proper thickness are used, is capable of converting concentrically (or radially) polarized radiated light 13 into linearly polarized light 14 and converting linearly polarized reflected light 14' into concentrically (or radially) polarized light 17. Therefore, a spot exhibiting excellent convergent performance such as the curve (c) shown in FIG. 9 can be obtained by conducting the conversion into linearly polarized light. As a result, the deterioration in the coupling efficiency due to the difference in the state of polarization can be prevented thanks to the reversibility of the conversion of the polarization {a polarizing element of the type described above can be used as the polarizer 10A which converts linearly polarized light into concentrically (or radially) polarized light 11}.

Figure 11A:
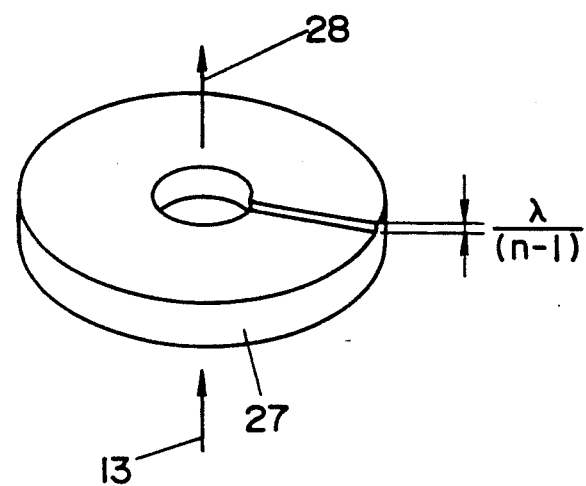
FIGS. 11(a) and 11(b) illustrate a manner in which phase delay of radiated light is made to correspond to the azimuth angle with respect to the center of a concentric circles performed in the optical head apparatus according to an embodiment of the present invention.

FIG. 11(a) illustrates another embodiment of the present invention with which the concentrically (or radially) polarized light is converted into the other state of polarization. Referring to FIG. 11(a), a phase different plate 27 has a step of a size of $\lambda/(n-1)$ (where symbol n represents the refractive index of the phase difference plate 27) over one round so as to give a phase lag in transmitted light at a position at which the azimuth angle is $\Phi$ with respect to the center. Since the field vectors of concentrically polarized light (or radially polarized light) at confronting positions with respect to the center are opposite to each other, the light intensity distributions at the convergent point cancels each other at the center as known from the curve (a) shown in FIG. 9. On the other hand, in a structure in which the phase difference plate 27 is positioned between the optical head and the reflection surface 16, the light 13 passing through the phase difference plate 27 is turned into light 28 whose field vectors are identical with each other at positions confronting one another with respect to the center. Therefore, the light intensity distribution at the convergent point can be improved as designated by the curve (b) shown in FIG. 9. Alternative to the above-described structure in which the phase difference plate 27 is positioned between the optical head and the reflection surface 16, a structure capable of exhibiting the same effect can be constituted by positioning the same between a light source 8 and the input grating coupler 4C.

Figure 11B:
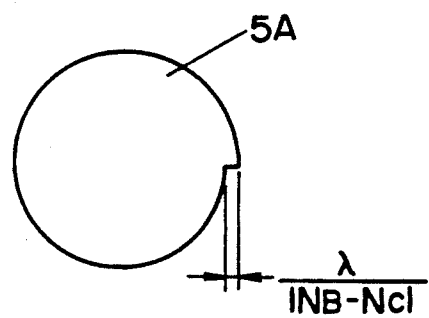

FIGS. 11(b) illustrates the other embodiment of the present invention capable of converting concentrically polarized (or radially polarized) light into the other state of polarization for the purpose of obtaining the same effect obtained from the structure shown in FIG. 11A. That is, a step is formed on the outer peripheral surface of the transparent layer 5A having a low refractive index and making contact with the waveguide layer 3C, having a size of $\lambda/|N_B-N_C|$ (where $N_B$ and $N_C$ respectively represent the equivalent refractive indices of waveguide light beams 12B and 12C) so as to cause a phase lag in the waveguide light 12B to become Φ at a position at which the azimuth angle with respect to the center is Φ. Therefore, radiated light 13 from the grating coupler 4B is turned into light having field vectors which are identical with each other at positions confronting with respect to the center, so that the light intensity distribution at the convergent point can be improved as designated by the curve (b) shown in FIG. 9.

Figure 12A:
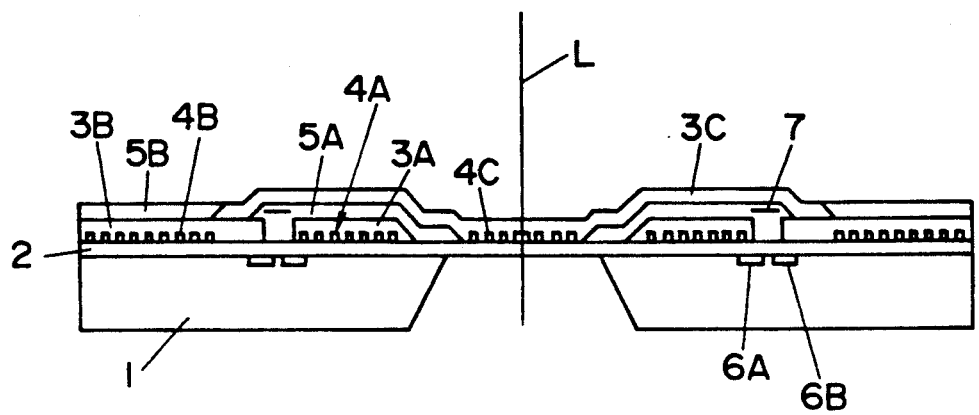
FIGS. 12(a) and 12(b) are cross sectional views which illustrate the optical head apparatus according to another embodiment of the present invention.
Figure 12B:
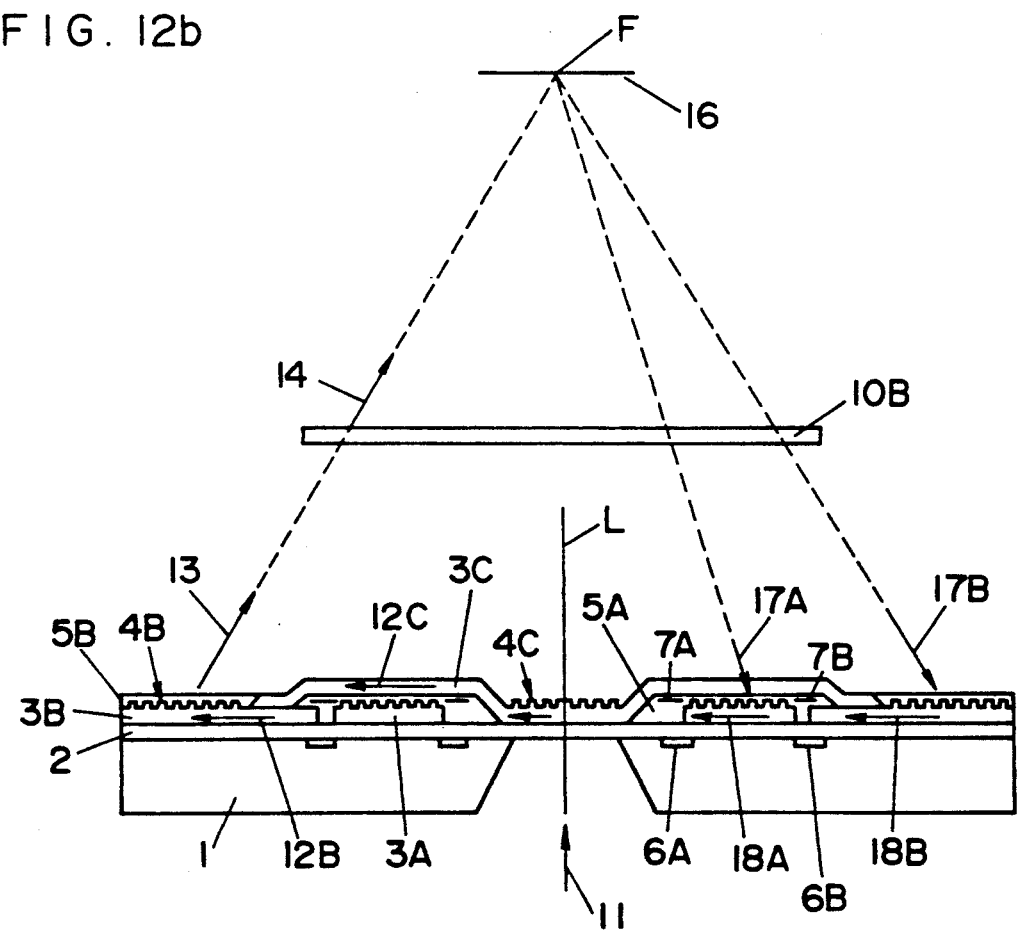

FIGS. 12(a) and 12(b) are cross sectional views which illustrate the other embodiment of the present invention in which the structure of the waveguide layer is changed. The like reference numerals used to denote those employed in the first embodiment are given to the like elements so as to omit the explanation thereof. Referring to FIG. 12(a), the transparent layer 2 having a low refractive index is formed on the Si substrate 1. Concavities and convexities are formed on the surface of the transparent layer 2 (or another transparent layer formed thereon) by utilizing etching technology so that the grating couplers 4A, 4B and 4C are formed. The transparent layer 3 having a high refractive index is formed on the transparent layer 2, and the transparent layer 3 is constituted by the ring-like portion 3A and a ring-like portion 3B surrounding the portion 3A, the portions 3A and 3B being insulated from each other. A high refractive index transparent layer 3C is formed on the surface of the transparent layer 3A with a low refractive index transparent layer 5A held therebetween. The transparent layer 3C is positioned in contact with the transparent layer 3B at the outer surface thereof in a region in which the transparent layer 3C confronts the inner surface of the grating coupler 4B of the transparent layer 3B, while the same is positioned in contact with the transparent layer 2 in a circular region positioned on its inner surface. A low refractive index transparent layer 5B is formed on the surface of the transparent layer 3B so as to cover the region in which the grating coupler 4B is formed. The transparent layer 5B has the same refractive index as that of the transparent layer 5A, while the equivalent refractive index of the transparent layer 3A and that of 3B are the same. Photo detectors 6A and 6B are formed on the surface of the Si substrate 1 at positions corresponding to the insulating portion between the transparent layers 3A and 3B. The reflection film 7 is formed in the transparent layer 5A so as to cover the photo detectors 6A and 6B. As a result, the grating couplers 4A, 4B and 4C can be collectively formed on the surface of the transparent layer 2. Therefore, labor for manufacturing the grating couplers can be saved and the positional error possibly taken place between the couplers can be prevented which is superior to that given by the first embodiment.

On the other hand, referring to FIG. 12(b), the low refractive index transparent layer 2 is formed on the Si substrate 1, and the transparent layer 3 having a high refractive index is formed thereon. The transparent layer 3 is constituted by the ring-like portion 3A and the ring-like portion 3B surrounding the transparent layer 3A, the portions 3A and 3B being insulated therebetween. A high refractive index transparent layer 3C is formed on the surface of the transparent layer 3A with the low refractive index transparent layer 5A held therebetween. The transparent layer 3C is positioned in contact with the transparent layer 3B in a region in which the transparent layer 3C is positioned in contact with the inner peripheral side of the grating coupler 4B, and the same is positioned in contact with the transparent layer 2 in the circular region positioned on the inner peripheral side of the grating coupler 4B. A low refractive index transparent layer 5B is formed on the surface of the transparent layer 3B so as to cover the region of the grating coupler 4B. The transparent layer 5B has the same refractive index as that of the transparent layer 5A, while the equivalent refractive indexes of the transparent layers 3A and 3B are the same. A grating coupler 4C arranged to be concentric or spiral with respect to the central axis L is formed on the surface of the transparent layer 3C, the grating coupler 4C being formed in a circular region which is concentrical with the central axis L. A photo detector 6B is formed on the surface of the Si substrate 1 at a position corresponding to the insulation region between the transparent layers 3A and 3B, while the photo detector 6A is formed at a position corresponding to the innermost peripheral portion of the transparent layer 3A. Reflection film 7A and 7B are formed in the transparent layer 5A so as to cover the photo detectors 6A and 6B. Light 11 which has been converted into concentrically polarized light (or radially polarized light) is inputted and coupled in the waveguide layer 3C by the grating coupler 4C so that the light 11 is converted into waveguide light 12C in the TE mode (or TM mode) which is transmitted toward the outer periphery through the layer. The waveguide light 12C is shifted from the waveguide layer 3C to the waveguide layer 3B at the outermost peripheral region of the waveguide layer 3C so that the waveguide light 12C is converted into waveguide light 12B. The waveguide light 12B is radiated from the grating coupler 4B so as to be turned into and concentrically polarized (or radially polarized) radiated light 13 before being converted into linearly polarized light 14 by passing through the polarizing element 10B. Then, the light 14 is converged at the point F on the reflection surface 16 of the optical disc. Light reflected by the reflection surface 16 is again converted into concentrically polarized (or radially polarized) light beams 17A and 17B since it passes through the polarizing element 10B. The light beams 17A and 17B are converted into waveguide light beams 18A and 18B in the TE mode (or TM mode) each of which inwards passes toward the inner peripheral side through the layer after they having been inputted and coupled in the waveguide layers 3A and 3B by the grating couplers 4A and 4B. Both the waveguide light beams 18A and 18B are radiated at the innermost peripheral portions of the waveguide layers 3A and 3B so as to be received by the photo detectors 6A and 6B. The reflection films 7A and 7B reflect radiated light from the end portions of the waveguide layers 3A and 3B so that substantially all of radiated light is received by the photo detectors 6A and 6B. The reflection films 7A and 7B also act to prevent scattered light or disturbance light of waveguide light 12C to enter the photo detectors 6A and 6B. In general, the coupling efficiency of the reflected light 17A into waveguide light 18A by the grating coupler 4A depends on the light distribution of the reflected light 17A. Therefore, there is a case in which a higher coupling efficiency can be realized depending upon the light distribution by setting the propagating direction of the returning waveguide light toward the inner peripheral side. In this case, the coupling efficiency of reflected light can be improved according to this embodiment. The fact whether the propagating of the returning waveguide light is set toward the inner peripheral side or toward the inner peripheral side is determined depending upon the designed pitch of the grating coupler 4A.

Figure 13:
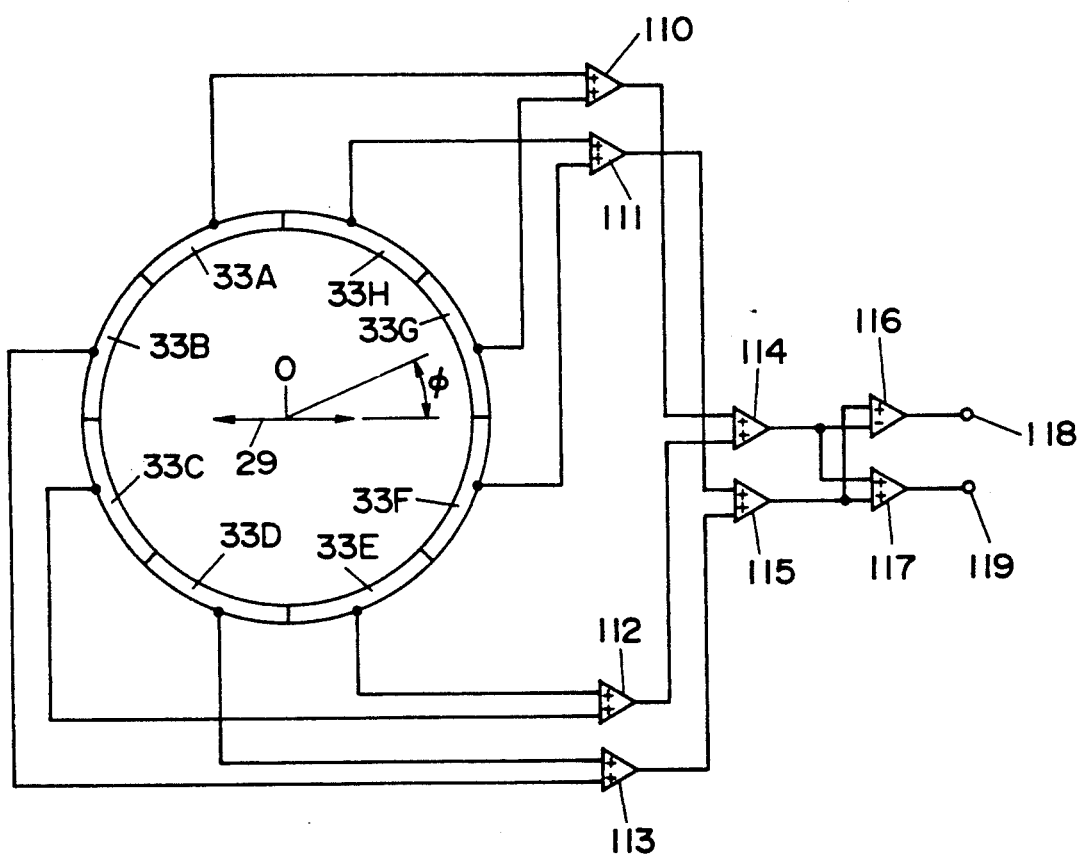
FIG. 13 is an explanatory view which illustrates the detection of the signal for reproducing a magnetic signal by the optical head apparatus according to a second embodiment of the present invention.

Then, a second embodiment of the present invention will be described with reference to FIGS. 13 to 15. The optical head apparatus according to the second embodiment is structured similarly to the optical head apparatus according to the first embodiment of the present invention except for a polarization conversion means for radiated light and a reproduced signal detection method. FIGS. 6 and 7 used to describe the first embodiment are also used here and description to the similar elements are omitted. Although the polarizing element 10B have been used as the polarization conversion means according to the first embodiment, a quarter wavelength plate is employed according to the second embodiment. FIG. 13 illustrates the signal detection operation performed by the optical head apparatus according to the second embodiment. The photo detector 6A or 6B is equally divided by four straight lines passing through the center O including a straight line running parallel to the optical axis of the ¼ wavelength plate into 8 regions (that is, 33A, 33B, 33C, 33D, 33E, 33F, 33G and 33H). The additions of photo detectors 33A, 33C, 33E and 33G are conducted by adding amplifiers 110, 112 and 114, while the additions of photo detectors 33B, 33D, 33F, and 33H are conducted by adding amplifiers 111, 113 and 115. Then, the differences of the above-described photo detectors are derived by a differential amplifier 116. As a result, a reproduction signal 118 from a recording dot signal (a magnetic signal) can be obtained. On the other hand, a reproduction signal 119 from a pit (concavities and convexities) signal can be obtained by deriving the sum by using an adding amplifier 117.

Figure 14:
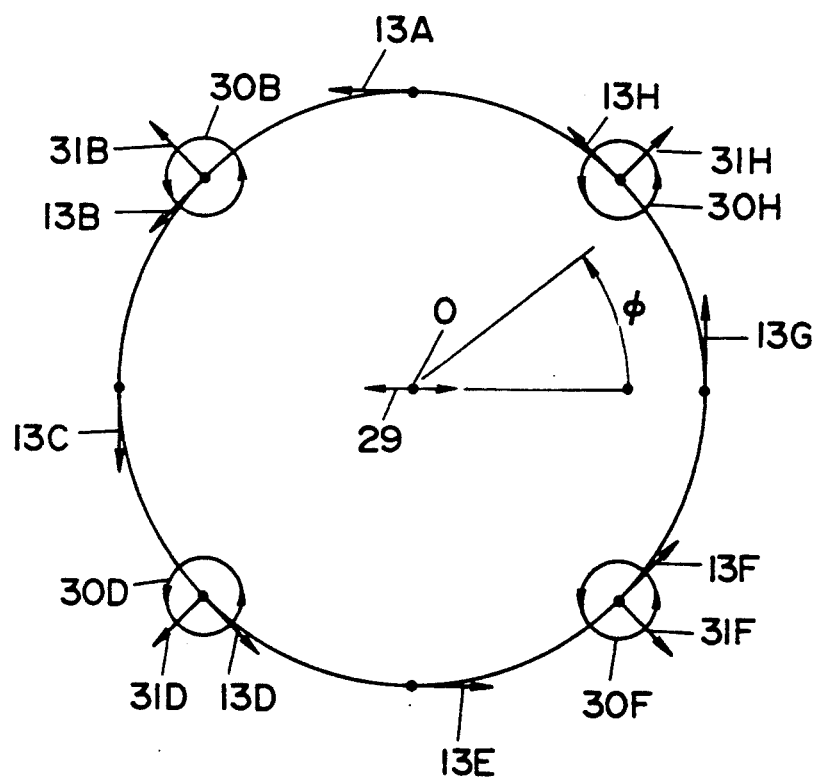
FIG. 14 is an explanatory view which illustrates a change in the state of polarization taken place in the optical head apparatus according to the second embodiment of the present invention.

FIG. 14 illustrates a change in a state of polarization performed by the optical head apparatus according to the second embodiment of the present invention. Radiated light 13 is in the form of concentrically polarized light (the directions of the plane of vibration are indicated by the arrows 13A, 13B, 13C, 13D, 13E, 13F, 13G and 13H). Therefore, the state of polarization of light 13, when the azimuth angle Φ is 0, 90, 180 or 270 degrees, is not changed even if light 13 has passed through the quarter wavelength plate on the optical axis 29. However, the state of polarization of light 13 is converted into circularly polarized light (30B, 30D, 30F and 30H) when the azimuth angle Φ is 45, 135, 225 or 315 degrees. The light 13 is converted into eliptically polarized light at the deflected positions between the above-described angular degrees. The states of polarization of reflected light beams 17A and 17B are not changed when the azimuth angle Φ is 0, 90, 180 or 270 degrees even if reflected light beams 17A and 17B have twice passed through the quarter wavelength plate. The same is converted into radially polarized state (31B, 31D, 31F and 31H) when the azimuth angle Φ is 45, 135, 225 or 315 degrees. The reflected light beams 17A and 17B are converted into eliptically polarized light at the azimuth positions between the above-described angular degrees.

Figure 15:
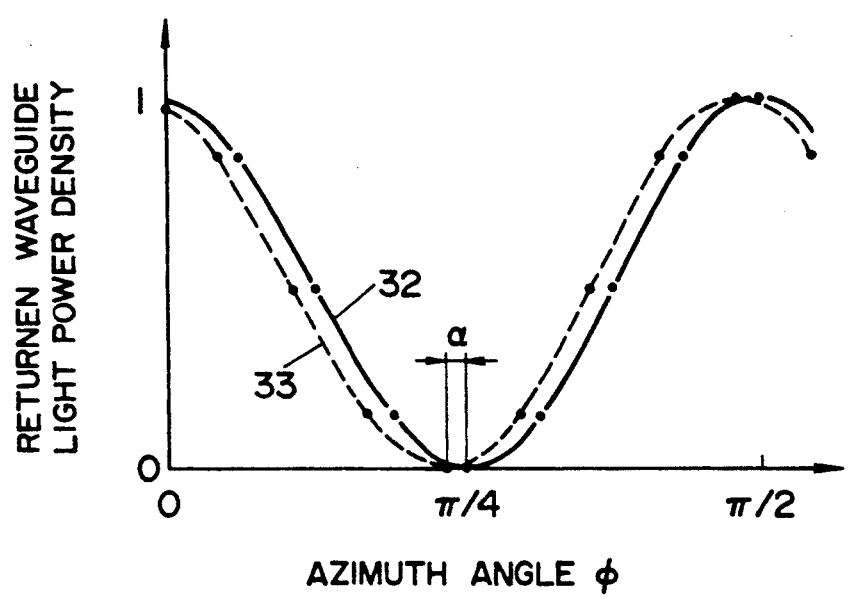
FIG. 15 is a view which illustrates the relationship between the power density of return waveguide light and the azimuth angle taken place in the optical head apparatus according to the second embodiment of the present invention.

FIG. 15 illustrates the relationship between the energy density of returned waveguide light and the azimuth angle according to the second embodiment of the present invention. Reflected light 17A or 17B is inputted and coupled by the grating coupler 4A or 4B so as to be converted into waveguide light 18A or 18B. Assuming that waveguide light on the emission side is in the TE mode, concentrically polarized light beams in the directions 13A, 13C, 13E and 13G are inputted and coupled so as to be converted into waveguide light in the TE mode, while radially polarized light beams 31B, 31D, 31F and 31H are converted into waveguide light in the TM mode. Eliptically polarized light at the azimuth position between the above-described positions becomes waveguide light in which TE and TM modes are mixed. The equivalent refractive index of waveguide light in the TE mode and that in the TM mode are generally different from each other although its difference is slight. Therefore, as is apparent from Equation (1), the diffraction angle of radiated mode light becomes different between TE mode and TM mode. Therefore, input coupling efficiency of concentrically polarized light which has been returned at a radiation diffractive angle of TE mode waveguide light into waveguide light (TE mode) is large. However, the input coupling efficiency of radially polarized light (31B, 31D, 31F and 31H) which has been returned at the same angle into waveguide light (TM mode) is small. That is, since input-coupled waveguide light is substantially in the TE mode from which TM mode waveguide light is substantially removed, the energy density of returned waveguide light describes a periodical curve 32 with respect to the azimuth angle Φ as shown in FIG. 15. Provided that the reflection surface of the optical disc is made of a magnetic material and the polarization plane of the reflected light is rotated by α due to the magnetooptic effect, the arrangement of the state of the polarization of reflected light is rotated by α after it has passed through the quarter wavelength plate shown in FIG. 14. Therefore, the periodical curve 32 shown in FIG. 15 is shifted by α so that the periodical curve 32 becomes a periodical curve 33. As described above, since the change in the plane of polarization depending upon the presence of the magnetic signal appears in the form of rotation of the distribution of the quantity of returned waveguide light, the magnetic signal can be reproduced by a signal output from the difference amplifier 116. Although the waveguide light 12B has been explained as that in the TE mode in the description above, the reproduction of the magnetic signal can be conducted based on the same principle if the waveguide light 12B is in the TM mode. In the above-described embodiment in which the quarter wavelength plate is employed as an alternative to the polarizing element 10B, the field vectors are opposite to each other at diagonal positions with respect to the center O and cancels with each other at the light converging point. Therefore, the convergent performance is insufficient. Therefore, the convergent performance must be improved by employing in combination, a means for causing the phase lag of radiated light to make equal to the azimuth angle Φ with respect to the center O of the concentric circle as shown in FIG. 11. For example, when the quarter wavelength plate is combined with the phase difference plate 27 shown in FIG. 11(a) so as to be arranged in parallel along the optical axis, the light intensity distribution at the convergent point can be approximated to the curve (b) shown in FIG. 9 so that convergent performance can be improved.

Then, a third embodiment for the detection of the TE signal according to the present invention will be described with reference to FIGS. 16 and 17. The optical head apparatus of the third embodiment are constituted similarly to the optical head apparatus of the first embodiment of the present invention excepting the method of detecting the TE signal. Accordingly FIGS. 6 and 7 are again used here and explanation to the same elements is omitted from the descriptions.

FIG. 16 illustrates the system for detecting the signal according to the third embodiment of the present invention. The photo detector 6A or 6B is equally divided into four regions (that is 35A, 35B, 35C and 35D) by two straight lines passing through the center O including a straight line running parallel to a rotational direction 34 of the optical disc. The additions of the photo detectors 35B and 35D are conducted by an adding amplifier 120, and additions of the photo detectors 35A and 35C are conducted by an adding amplifier 121. The two additional signals are added by an adding amplifier 122 so that a reproduction signal 124 is produced while a signal 125 is produced by deriving the difference between the two additional signals by a differential amplifier 123.

Figure 17:
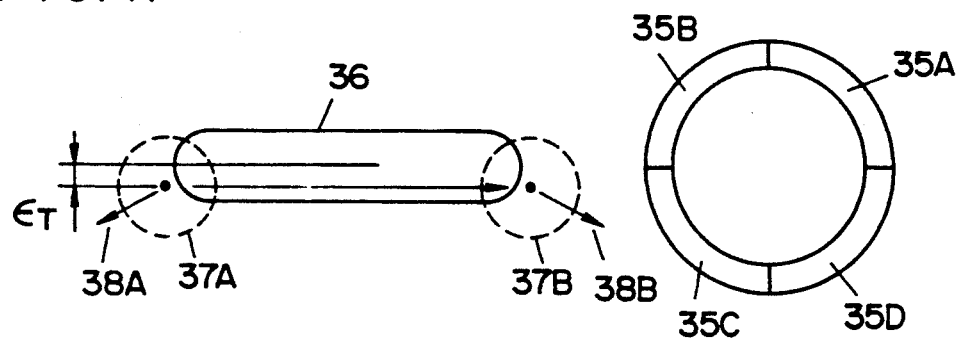
FIG. 17 is an explanatory view which illustrates a principle of detecting the TE signal in the optical head apparatus according to the third embodiment of the present invention.
Figure 18:
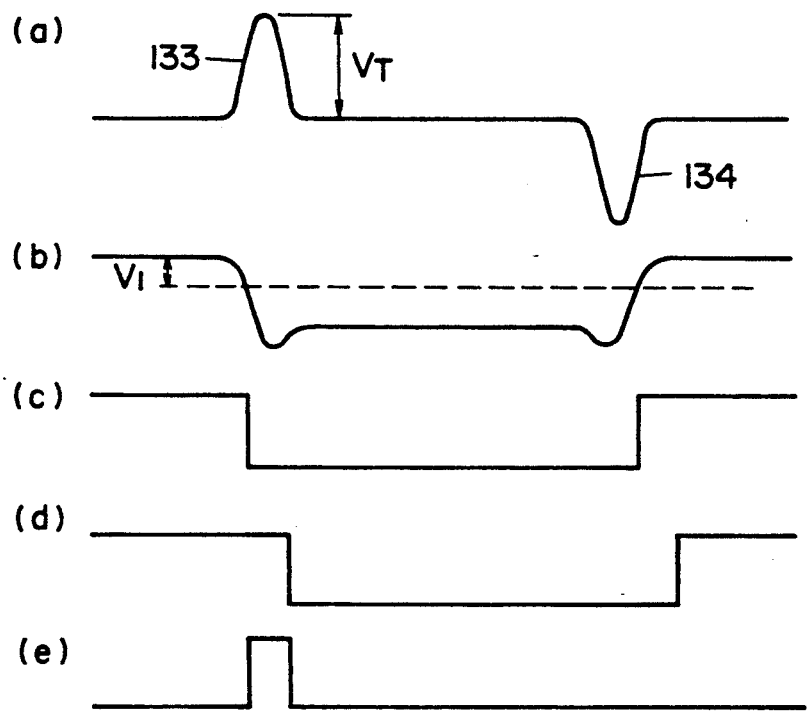
FIGS. 18a–e are views which illustrates the sinusoidal operation of the optical head apparatus shown in FIG. 16.
Figure 19:
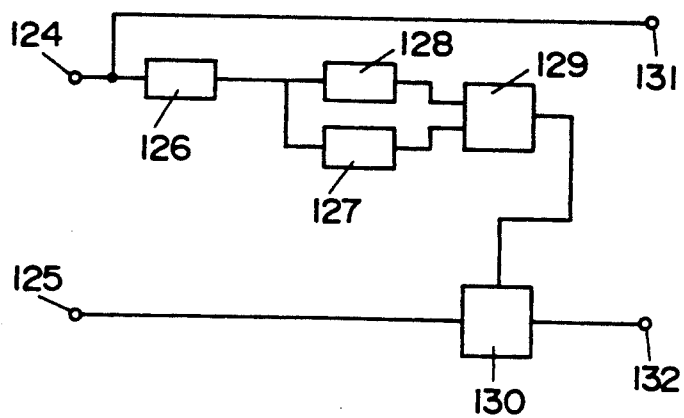
FIG. 19 is an electrical block diagram which illustrates the optical head apparatus as shown in FIG. 16. Sheet 17 is a legend used with the above Figures.

FIG. 17 illustrates the principle on which TE signal detection is based, FIG. 18 illustrates the operation waveforms of the signals, and FIG. 19 is an electrical block diagram of this embodiment. When a beam spot scans the pit 36 formed on the reflection surface of the optical disc with an off-track value $\epsilon_T$, the quantity of light which can be detected by the photo detector 35C is increased since light diffract in the direction 38A when the beam spot is positioned at 37A. When the beam spot is positioned at 37B, light diffracts in the direction 38B. Therefore, the quantity of light which can be detected by the photo detector 35D is increased. When the beam spot is positioned between 37A and 37B, the total quantity of light which can be detected by each of the photo detectors is decreased due to the diffraction taken place at the pit 36. Accordingly, the differential signal 125 shows a waveform (a), while the reproduction signal 124 shows a waveform (b). When the signal 124 is subjected to a comparison at a level $V_1$ a signal waveform (c) exceeding the level $V_1$ can be obtained. A signal waveform (d) is obtained by delaying the signal waveform (c) in a delay circuit 127, while a signal waveform (e) is obtained by inverting the signal waveform (c) in an inversion circuit 128 and by deriving AND with a delay signal (d) in an AND circuit. The polarity of an amplitude $V_T$ of the signal 133 on the signal waveform (a) is inverted depending upon whether the off-track value $\epsilon_T$ is positive or negative. The amplitude $V_T$ increases or decreases depending upon the degree of the off-track value $\epsilon_T$. Therefore, the signal 132 can be used as the TE signal by using the signal waveform (e) as a gate signal and by detecting the peak output $V_T$ of the signal waveform (a) with the use of a sample holding circuit 130. In particular, it has been difficult for a disc whose pit depth is $\lambda/5$ such as a compact disc to conduct the TE signal detection depending upon the push-pull method. However, TE signal detection exhibiting high sensitivity can be conducted according to the above-described method.

Although the amplitude $V_T$ of the signal 133 on the signal waveform (a) is used as the TE signal, it may be replaced by the amplitude of the signal 134. The time period of the detection signal obtained when the signal waveform (a) has been subjected to a comparison at a certain level can be used as the TE signal as an alternative to the amplitude.

As described above, the optical head apparatus according to the present invention comprises: the polarizing element capable of conducting conversions between linearly and concentrically (radially) polarized light beams; and means such as the phase difference plate capable of converting light into concentrically polarized (radially polarized) light having field vectors which are identical with each other at opposite positions. Therefore, spots exhibiting high convergence performance can be obtained, and accordingly, a thin film optical head capable of recording high density signals can be provided. Furthermore, since the light receiving grating coupler is formed in a circular region on the inside of the grating coupler for radiating light, reflected light in this region can be converted into waveguide light and detected so that the quality of reproduction signals and control signals can be improved. Furthermore, since the quarter wavelength plate and/or the above-described phase difference plate or the like is employed, the grating coupler acts as an analyzer for reflected light including magnetic signal component, the reflected light being from the optical disc. Therefore, the reproduction of the magnetic signal can be conducted by dividing the light receiving elements and by detecting returned waveguide light. Furthermore, the optical head apparatus capable of tracking control for optical discs such as read-only optical discs of the type having pits whose depth is from 1/5 to ¼ wavelength can be provided by dividing the light receiving element and by detecting returned waveguide light.

What is claimed is:

1. An optical head apparatus including a converging means, said converging means comprising:
   a first waveguide layer having a central region;
   a first concentric or spiral periodical structure formed on said first waveguide layer around said central region;
   a laser beam source for generating a laser beam;
   coupling means, having a center axis, for guiding said laser beam emitted from said laser beam source to a cross point between said center axis and said first wave-guide layer within said central region of said first waveguide layer,
   said first waveguide layer converting said laser beam into waveguide light and leading said waveguide light from said central region to said periodical structure which causes said waveguide light to be radiated outside of said first waveguide layer so as to be converged to at least one converging point outside of said first waveguide layer.

2. An optical head according to claim 1, wherein light radiated from said converging means has a first polarization state and said optical head further comprises a polarizing means, disposed between said converging means and said converging point, for converting said light, which is radiated from said converging means and said first polarization state, into linearly or circularly polarized light.

3. An optical head apparatus according to claim 2, wherein said polarizing means includes means for converting light reflected from a reflection surface carrying signal marks and disposed adjacent to said converging point into said first polarization state.

4. An optical head apparatus according to claim 1, further comprising a polarizing means disposed between said laser beam source and said first waveguide layer, for polarizing said laser beam into one of concentrically circularly polarized light, radially polarized light and circularly polarized light.

5. An optical head apparatus according to claim 1, further comprising a phase difference plate disposed between said converging means and said converging point and having a surface oriented parallel with said waveguide layer, said phase difference plate comprising means or retarding a phase of light passing therethrough so as to cause a phase lag to occur in said radiated light from said converging means when said radiated light passes through said phase difference plate, said phase lag being a function of an aximuth angle in polar coordinates on said surface of said phase difference plate, said azimuth angle having an original point which is a cross point between said center axis and said surface of said phase difference plate, such that said phase lag varies equally as said azimuth angle varies.

6. An optical head apparatus according to claim 1, further comprising a transparent layer provided between said cross point and said periodical structure, making contact with said first waveguide layer by a contact width, said contact width being a function of an azimuth angle in polar coordinates on a surface of said first waveguide layer, said azimuth angle having an original point which is said cross point, and wherein said transparent layer comprises means for retarding a phase of light passing therethrough so as to cause a phase lag to occur in said waveguide light led to said first periodical structure so that said phase lag varies equally as said azimuth angle varies.

7. An optical head apparatus according to claim 1, further comprising a phase difference plate disposed between said laser beam source and said coupling means, having a surface oriented parallel with said first waveguide layer and comprising means for retarding a phase of light passing therethrough so as to cause a phase lag to occur in said laser beam from said laser beam source, said phase lag being a function of an azimuth angle in polar coordinates on said surface of said phase difference plate, said azimuth angle having an original point which is a cross point between said center axis and said surface of said phase difference plate, such that said phase lag varies equally as said azimuth angle varies.

8. An optical head apparatus according to claim 1, 2, 3, 5, 6 or 7, further comprising a second waveguide layer provided between (i) said cross point between said center axis and said first waveguide layer and (ii) said first periodical structure and making contact with said first waveguide layer, photo-detecting means provided adjacent to said second waveguide layer between (i) the cross point between said center axis and said first waveguide layer and (ii) said first periodical structure, said radiated light from said first periodical structure being reflected from a reflecting surface arranged adjacent to said converging point, and then again turned into return waveguide light led to said cross point between said center axis and said first waveguide layer through said first waveguide layer, by said first periodical structure, a part of said return waveguide light branching into and being led through said second waveguide, and then detected by said photodetecting means.

9. An optical head apparatus according to claim 8, wherein signal marks are formed on said reflection surface along a track having an extending direction, said photo-detecting means is divided into four equal regions by two straight lines which are orthogonal to said center axis and one of which is parallel with the extending direction of said track, said four regions of said detection means detect said return waveguide light, said apparatus further comprising adding means for adding detection signals from ones of said four regions of said detection means which are disposed diagonal to each other to obtain a first addition result and a second addition result, means for obtaining a difference between said first addition result and said second addition result so as to obtain a difference signal having a peak value and a signal length, mean for adding said first addition result and said second addition result so as to obtain a reproduction signal, and means for combining said difference signal and said reproduction signal so as to produce a tracking error signal.

10. An optical head apparatus according to claim 9, further comprising a first comparison circuit for comparing said reproduction signal with a predetermined level, a delay circuit for obtaining a delay signal by delaying said binary detection signal, as inversion circuit for obtaining an inverted signal by inverting said detection signal, an AND circuit for AND gating said delay signal and said inverted signal to output an AND signal, means for sample-holding the peak value or the signal length of said difference signal by using said AND signal as a gate signal to provide a sample-held signal, whereby said sample-held signal is adapted to be used as a tracking error signal.

11. An optical head apparatus according to claim 8, wherein a quarter wavelength plate having an optical axis is disposed between said converging means and said converging point, said reflection surface is made of a magnetic material, said photo-detecting mans is equally divided into eight regions by straight lines which are orthogonal to said center axis and one of which is parallel with the optical axis of said quarter wavelength plate, each of said regions of said detection means detects said return waveguide light, said apparatus further comprising adding means for adding detection signals from four of said regions of said detection means which are arranged diagonal to each other to obtain a first addition result and for adding detection signals from the remaining regions of said detection means to obtain a second addition result, and means for obtaining a difference between the first addition result and the second addition result and outputting said difference as a reproduction signal.

12. An optical head apparatus according to claim 8, further comprising a second waveguide layer provided between (i) said cross point between said center axis and said first waveguide layer and (ii) said first periodical structure, in parallel with said first waveguide layer, and a concentric or spiral second periodical structure provided in said second waveguide layer about said center axis, said radiated light from said first periodical structure being reflected from a reflecting surface carrying signal marks and arranged adjacent to said converging point, and then again turned into return waveguide light led through said second waveguide layer by said second periodical structure.

13. An optical head apparatus according to claim 12, wherein said second waveguide layer makes contact with said first waveguide layer, and said apparatus further comprises photo-detecting means provided between (i) said cross point between said center axis and said first waveguide layer and (ii) said first periodical structure, adjacent to said second waveguide layer, a part of said return waveguide converted by said second periodical structure branching into and being led through said second waveguide layer so as to be detected by said photo-detecting means.

14. An optical head apparatus according to claim 1, 2, 6 or 7, further comprising a second waveguide layer provided between (i) said cross point between said center axis and said first waveguide layer and (ii) said first periodical structure, in parallel with said first waveguide layer, and a concentric or spiral second periodical structure provided in said second waveguide layer about said center axis, said radiated light from said first periodical structure being reflected from a reflecting surface carrying signal marks and arranged adjacent to said converging point, and then again turned into return waveguide light led through said second waveguide layer by said second periodical structure.

15. An optical head apparatus according to claim 14, wherein said second waveguide layer makes contact with said first waveguide layer, and said apparatus further comprises photo-detecting mans provided between (i) said cross point between said center axis and said first waveguide layer and (ii) said first periodical structure, adjacent to said second waveguide layer, a part of said return waveguide converted by said second periodical structure branching into and being led through said second waveguide layer so as to be detected by said photo-detecting means.

16. An optical head apparatus according to claim 15, wherein a quarter wavelength plate having an optical axis is disposed between said converging means and said converging point, said reflection surface is made of a magnetic material, said photo-detecting means is equally divided into eight regions by straight lines which are orthogonal to said center axis and one of which is parallel with the optical axis of said quarter wavelength plate, each of said regions of said detection means detects said return waveguide light, said apparatus further comprising adding means for adding detection signals from four of said regions of said detection means which are arranged diagonal to each other to obtain a first addition result and for adding detection signals from the remaining regions of said detection means to obtain a second addition result, and means for obtaining a difference between the first addition result and the second addition result and outputting said difference as a reproduction signal.

17. An optical head apparatus according to claim 15, wherein signal marks are formed on said reflection surface along a track having an extending direction, said photo-detecting means is divided into four equal regions by two straight lines which are orthogonal to said center axis and one of which is parallel with the extending direction of said track, said four regions of said detection means detect said return waveguide light, said apparatus further comprising adding means for adding detection signals from ones of said four regions of said detection means which are disposed diagonal to each other to obtain a first addition result and a second addition result, means for obtaining a difference between said first addition result and said second addition result so as to obtain a difference signal having a peak value and a signal length, means for adding said first addition result and said second addition result so as to obtain a reproduction signal, and means for combining said difference signal and said reproduction signal so as to produce a tracking error signal.

18. An optical head apparatus according to claim 17, further comprising a first comparison circuit for comparing said reproduction signal with a predetermined level, a delay circuit for obtaining a delay signal by delaying said binary detection signal, as inversion circuit for obtaining an inverted signal by inverting said detection signal, an AND circuit for AND gating said delay signal and said inverted signal to output an AND signal, means for sample-holding the peak value or the signal length of said difference signal by using said AND signal as a gate signal to provide a sample-held signal, whereby said sample-held signal is adapted to be used as a tracking error signal.

* * * * *